United States Patent
Yu et al.

(10) Patent No.: US 10,354,039 B1
(45) Date of Patent: Jul. 16, 2019

(54) METHOD, SYSTEM, AND COMPUTER PROGRAM PRODUCT FOR IMPLEMENTING LEGAL PLACEMENT WITH CONTEXTUAL AWARENESS FOR AN ELECTRONIC DESIGN

(71) Applicant: Cadence Design Systems, Inc., San Jose, CA (US)

(72) Inventors: Henry Yu, Palo Alto, CA (US); Vinny George Korah, Tempe, AZ (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/396,205

(22) Filed: Dec. 30, 2016

(51) Int. Cl.
G06F 17/50 (2006.01)

(52) U.S. Cl.
CPC ...... *G06F 17/5072* (2013.01); *G06F 17/5081* (2013.01); *G06F 2217/06* (2013.01)

(58) Field of Classification Search
USPC .................................................. 716/118–125
See application file for complete search history.

(56) References Cited

U.S. PATENT DOCUMENTS

| | | | |
|---|---|---|---|
| 6,209,123 B1 | 3/2001 | Maziasz | |
| 6,370,673 B1 | 4/2002 | Hill | |
| 6,557,153 B1 | 4/2003 | Dahl | |
| 6,823,501 B1 | 11/2004 | Dahl | |
| 7,266,796 B1 | 9/2007 | Chu | |
| 7,937,682 B2 * | 5/2011 | Arunachalam | G06F 17/5072 716/118 |
| 9,465,908 B2 * | 10/2016 | Bischoff | G06F 17/50 |
| 2005/0198605 A1 * | 9/2005 | Knol | G06F 17/5072 716/124 |
| 2007/0245281 A1 * | 10/2007 | Riepe | G06F 17/5072 716/102 |
| 2007/0283306 A1 * | 12/2007 | Koefferlein | G06F 17/5068 716/119 |
| 2009/0199142 A1 | 8/2009 | Arunachalam et al. | |
| 2009/0307640 A1 | 12/2009 | Chapman | |
| 2013/0042217 A1 * | 2/2013 | Heng | G06F 17/5068 716/122 |
| 2014/0331198 A1 | 11/2014 | Bischoff et al. | |
| 2015/0067616 A1 | 3/2015 | Hsu et al. | |
| 2018/0144082 A1 | 5/2018 | Hanchinal | |

OTHER PUBLICATIONS

Non-Final Office Action dated Nov. 16, 2017 for U.S. Appl. No. 15/396,156.
Non-Final Office Action dated Mar. 9, 2018 for U.S. Appl. No. 15/396,178.

(Continued)

*Primary Examiner* — Binh Tat
(74) *Attorney, Agent, or Firm* — Vista IP Law Group, LLP

(57) ABSTRACT

Disclosed are techniques for implementing legal placement with contextual awareness for an electronic design. These techniques identify one or more hierarchies from one or more groups or one or more instances located at these one or more hierarchies in a layout or floorplan. A plurality of instances including the one or more identified instances may be promoted to an honorary top hierarchy. A layout operation may then be performed on the one or more identified instances based in part or in whole upon a boundary requirement and context information.

20 Claims, 21 Drawing Sheets

(56) References Cited

OTHER PUBLICATIONS

Final Office Action dated May 17, 2018 for U.S. Appl. No. 15/396,156.
Final Office Action dated Aug. 30, 2018 for U.S. Appl. No. 15/396,178.
Non-Final Office Action dated Oct. 4, 2018 for U.S. Appl. No. 15/396,156.
Non-Final Office Action dated Mar. 12, 2019 for U.S. Appl. No. 15/396,229.
Notice of Allowance dated Apr. 9, 2019 for U.S. Appl. No. 15/396,156.

\* cited by examiner

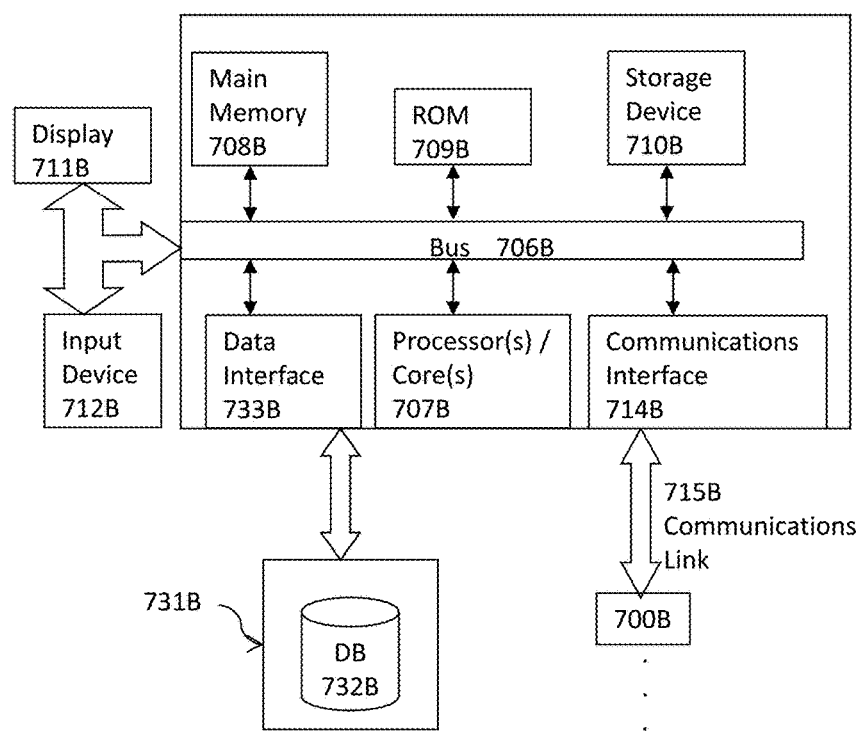

METHOD, SYSTEM, AND COMPUTER PROGRAM PRODUCT FOR IMPLEMENTING LEGAL PLACEMENT WITH CONTEXTUAL AWARENESS FOR AN ELECTRONIC DESIGN

CROSS REFERENCE TO RELATED APPLICATIONS

This application is related to U.S. patent application Ser. No. 15/396,156, entitled "METHOD, SYSTEM, AND COMPUTER PROGRAM PRODUCT FOR IMPLEMENTING PLACEMENT USING ROW TEMPLATES FOR AN ELECTRONIC DESIGN", U.S. patent application Ser. No. 15/396,229, entitled "METHOD, SYSTEM, AND COMPUTER PROGRAM PRODUCT FOR IMPLEMENTING A LEGAL PLACEMENT LAYOUT WITH SNAPPING TECHNIQUES FOR AN ELECTRONIC DESIGN", U.S. patent application Ser. No. 15/396,178, entitled "METHOD, SYSTEM, AND COMPUTER PROGRAM PRODUCT FOR IMPLEMENTING GROUP LEGAL PLACEMENT ON ROWS AND GRIDS FOR AN ELECTRONIC DESIGN". The contents of the aforementioned U.S. patent applications are hereby incorporated by reference in their respective entireties for all purposes.

BACKGROUND

When placing multiple groups of device instances in a row region in a placement layout or floorplan, these multiple groups of device instances may interact with one another. In addition, these multiple groups may have some spatial or functional relations with each other while one or more of these relations may bear on, for example, individual circuit components in these multiple groups. Nonetheless, a group (e.g., a module generated by a module generation process, a fig_group in OpenAccess®, a cell created by a make cell command, a block of instances or circuit component designs selected by a designer, etc.) includes a plurality of circuit component designs whose relative locations are fixed within a group. That is, a group is often generated for a plurality of individual circuit component designs so that the group may be manipulated by electronic design automation tools as a whole, without manipulating individual circuit components therein.

Often, a designer may need to manipulate the design details within a group in a hierarchical placement layout or floorplan. For example, a designer may need to modify one or more instances located at the third hierarchy in a group that is located at the top hierarchy in a hierarchical placement layout or floorplan. Some conventional approaches require descend into the third hierarchy so that EDA (electronic design automation) tools may access these one or more instances at the third hierarchy while design data located at the fourth or lower hierarchies may not be accessed or even exposed in the layout window. Although the designer may perform various operations on these one or more instances at the third hierarchy, the designer does so without regard instances at higher hierarchies—the top hierarchy and the second hierarchy above the third hierarchy.

Some other conventional approaches attempt to address this shortcoming by flattening either the entire group or all the way to the third hierarchy so that the design details at and above the third hierarchy within the group is exposed. Nonetheless, these other conventional approaches still fail to provide proper context information about design details outside the group to the EDA tools while manipulating the one or more instances at the third hierarchy in the selected group of interest.

These shortcomings of conventional approaches are further exacerbated in top down approaches where the portion of an integrated circuit (IC) design at higher hierarchies are implemented before that at lower hierarchies. In such top-down approaches, higher level groups, cells, or blocks are first placed into the layout, and the details at lower hierarchies of these higher hierarchy groups, cells, or blocks are subsequently implemented. With conventional approaches descending into a specific group, the internal details of a group are thus implemented without regard to surrounding circuit component designs outside the group and thus often require several rounds of iterative implementations to implement or optimize a group of instances. That is, conventional approaches for manipulating hierarchical designs fail to provide proper context information across the boundaries of a group, cell, or block during the manipulation within the boundaries of the group, cell, or block.

Therefore, there is a need for implementing context aware placement for an electronic design to address at least the foregoing issues with conventional approaches.

SUMMARY

Disclosed are method(s), system(s), and article(s) of manufacture for implementing legal placement with contextual awareness for an electronic design in various embodiments. Some embodiments are directed to a method for implementing legal placement with contextual awareness for an electronic design. In these embodiments, one or more hierarchies from one or more groups or one or more instances located at these one or more hierarchies may be identified in a layout or floorplan. A plurality of instances including the one or more identified instances may be promoted to an honorary top hierarchy. A layout operation may then be performed on the one or more identified instances based in part or in whole upon a boundary requirement and context information.

In some embodiments, one or more affected groups, a hierarchical structure of the layout or floorplan may be optionally updated. To identify these one or more hierarchies or these one or more instances, an environment that provides full or lightweight access to individual circuit component designs in the layout may be configured for the one or more context aware modules; a selection mode that includes a hierarchy selection mode or an instance selection mode may be identified or selected; and the one or more hierarchies or the one or more instances may be identified based in part or in whole upon the selection mode in some embodiments.

In some of these embodiments, these one or more instances may be identified into a plurality of honorary top hierarchy instances; and one or more additional instances located at one or more intervening hierarchies between the honorary top hierarchy and the one or more hierarchies may also be identified into the plurality of honorary top hierarchy instances. The one or more instances may then be modified based in part or in whole upon a user input.

To promote the plurality of instances, a block of the memory may be configured based in part or in whole upon a plurality of physical characteristics of the layout or the floorplan for storing hierarchical design information of the layout or the floorplan; a plurality of honorary top hierarchy instances may be identified; and circuit component designs originally located at the honorary top hierarchy may also be identified into the plurality of honorary top hierarchy instances in some embodiments.

In some of these embodiments, a model may be created at least by inserting and arranging the plurality of honorary top hierarchy instances; the layout or the floorplan may be maintained without modifications; and the model may be provided to the one or more context aware modules for performance of the layout operation.

In some embodiments, promoting the plurality of instances may include identifying a plurality of honorary top hierarchy instances. A first hierarchy at which the plurality of honorary top hierarchy instances are located may be identified; one or more higher hierarchies at or above the first hierarchy may also be identified; and a hierarchical structure of the layout or the floorplan may be modified at least by flattening a first portion of the layout or the floorplan according to the first hierarchy.

In some other embodiments, promoting the plurality of instances may include modifying the hierarchical structure of the layout or the floorplan at least by flattening a second portion of the layout or the floorplan according to the one or more higher hierarchies; and information of the hierarchical structure may be updated based in part or in whole upon results of flattening the first portion or results of flattening the second portion.

In some embodiments, performing the layout operation may include identifying or determining the boundary requirement, wherein the boundary requirement comprises a maximal flexibility boundary requirement, a fixed boundary requirement, or a derived boundary requirement; and a modified layout created by modifying a hierarchical structure of the layout or floorplan or a model created from the layout or the floorplan and stored in a block in the memory may be identified. In addition, the context information pertaining to the one or more instances may be identified; and the layout or the floorplan may be modified at least by performing the layout operation on the one or more instances based in part or in whole upon the boundary requirement and the context information.

In some of these embodiments, modifications made to the model by the layout operation may be propagated to the layout or floorplan when the model is identified for the layout operation; and results of promoting the plurality of instances to the honorary top hierarchy may be undone.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

More details of various aspects of the methods, systems, or articles of manufacture for implementing context aware placement for an electronic design are described below with reference to FIGS. 1-7B.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 7B illustrates a computerized system on which a method for implementing legal placement with contextual awareness for an electronic design may be implemented.

DETAILED DESCRIPTION

Various embodiments are directed to a method, system, and computer program product for implementing legal placement with contextual awareness for an electronic design. Other objects, features, and advantages of the invention are described in the detailed description, figures, and claims.

To address the shortcomings of conventional approaches, various embodiments configure the environment of EDA tools to enable customizable selection of one or more instances on which layout operations are to be performed and promote these one or more instances at one or more lower hierarchies to an honorary top hierarchy in a row region of a layout or floorplan. One or more other instances or circuit component designs may also be identified and promoted to the honorary top hierarchy to provide appropriate context information for the layout operations to be performed on the one or more selected instances.

Promoting instances to the honorary top hierarchy may be performed on the hierarchical structure of the layout or the floorplan in some embodiments or on a custom generated model stored in a block of memory in some other embodiments. These instances promoted to the honorary top hierarchy may be identified across the boundaries of blocks, cells, or groups, without having to flatten the entire group, block, cell, or layout. The desired layout operations may then be performed on the identified instances within the appropriate context. It shall be noted that the terms "blocks," "cells," "groups," "FigGroups," and "fig_groups" may be used interchangeably throughout the entire disclosure, unless otherwise specifically recited or distinguished.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
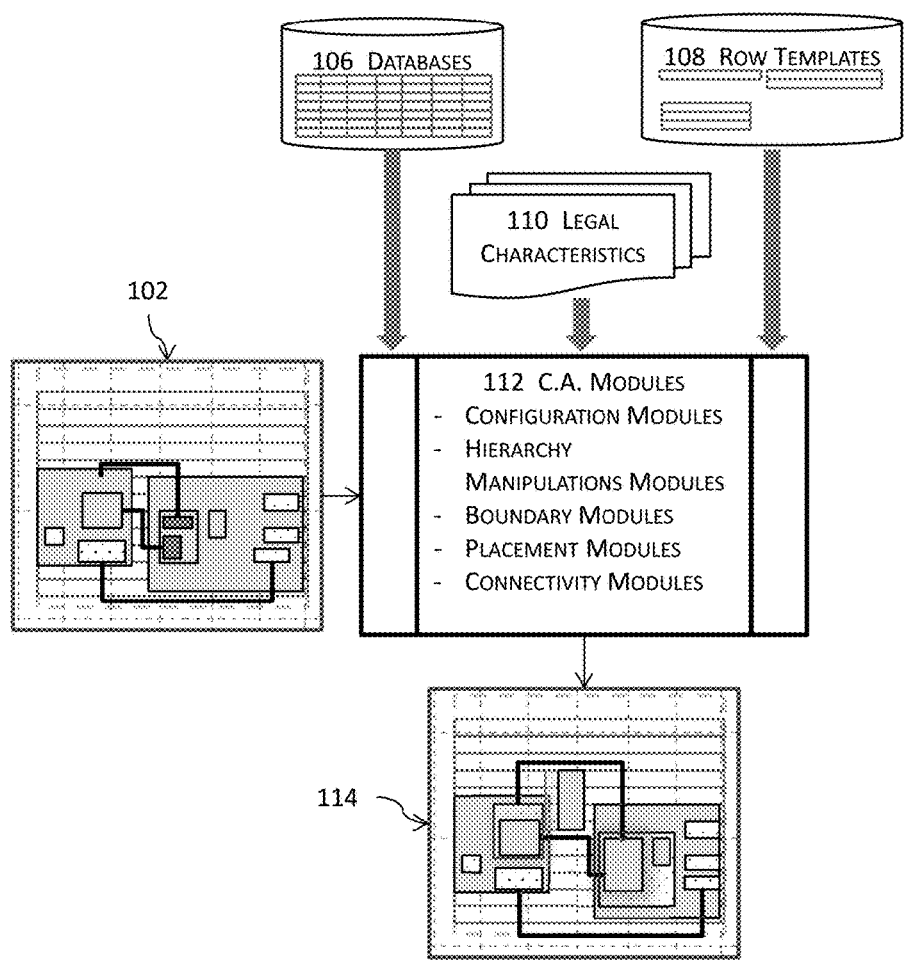
FIG. 1 illustrates a high level block diagram for implementing legal placement with contextual awareness for an electronic design in one or more embodiments.

FIG. 1 illustrates a high level block diagram for implementing legal placement with contextual awareness for an electronic design in one or more embodiments. In these embodiments, a plurality of context aware modules 112 such as those described with reference to FIG. 7A may be configured to manipulate (e.g., modify, optimize, etc.) an example placement layout or a floorplan 102 having two groups each having a plurality of instances placed in a row region in the placement layout or floorplan. A group may be a physical group such as a cell, a block, a FigGroup in OpenAccess®, etc. or a logical group such as a collection of circuit component designs selected by a designer for manipulation as a whole. More details about a group of instances are described in the U.S. patent applications listed in the section entitled Cross Reference to Related Applications.

The plurality of context aware modules may be operatively coupled with a database 106 storing thereupon, for example, design details of a layout or a floorplan for an electronic design of interest (e.g., an integrated circuit design), a row template repository 108 storing a plurality of row templates that may be applied to one or more row regions in placement layouts and/or floorplans, and a plurality of legal characteristics 110 that may be respectively stored for each row or row template. The plurality of legal characteristics 110 may include, for example, one or more permissible rows in which an instance may be inserted, one or more permissible orientations in which an instance may be oriented in a specific row, permissible alignment options for an instance with respective one or more grids (e.g., Fin grid, polysilicon grid, etc.) or one or more permissible rows, permissible offset values for an instance in a legal row, or any other suitable requirements, or any combinations thereof. More details about permissible characteristics are described in the U.S. patent applications listed in the section entitled Cross Reference to Related Applications.

In some embodiments, a listing of one or more permissible characteristics (e.g., those in 110) may be respectively created for each group and each instance in the group. These listings may be computed on the fly in a nearly real-time fashion in some embodiments or may be pre-computed and stored for reference by the plurality of context aware modules 112. Upon receiving a request to manipulate a placement layout, a floorplan, or a portion thereof (e.g., a row region) in an electronic design of interest from, for example, the user interface, these context aware modules 112 may function in conjunction with one or more EDA (electronic design automation) modules to perform various operations on the placement layout or floorplan 102 to generate a manipulated placement layout or floorplan 114 that satisfies various requirements, design rules, or constraints (collectively requirements for plural or requirement for singular).

More specifically, the plurality of context aware modules 112 may logically or actually flatten a portion of a hierarchical placement layout or floorplan to provide access to one or more instances of interest or one or more lightweight representations therefor in the placement layout or floorplan while maintaining one or more other instances that have not been logically or actually flattened within the context. The plurality of context aware modules 112 may then manipulate by performing various operations on the one or more instances of interest or the one or more lightweight representations therefor in the context of the one or more other instances that have not been actually or logically flattened.

Unlike some conventional approaches that flatten every instance from the highest hierarchy down to the hierarchy of interest, some embodiments described herein selectively flatten (logically or actually) a smaller portion of the pertinent instances for manipulation within the context of one or more other instances that are not flattened. As a result, these embodiments conserve computational resources such as network inputs/outputs to check out additional instances from the layout database, memory footprint to store these additional, flattened instances, and processor cycles to flatten these additional instances.

Unlike some other conventional approaches that descend into a specific group for manipulation without regard to other circuit component designs outside of the specific group, various embodiments provide accessibility and thus ability to perform operations within a group while maintaining the circuit component designs outside the group. These operations may include, for example, inserting a single circuit component design, an instance, or a group into a row region in a placement layout or floorplan, adding, removing, or rearranging the internal design details within an existing group, optimizing the placement or floorplan within a group or in a portion of the placement layout or floorplan, etc. More details about various functions of the plurality of context aware modules 112 will be described below with reference to FIGS. 2-5C as well as the examples illustrated and described with reference to FIGS. 6A-K below.

Figure 2:
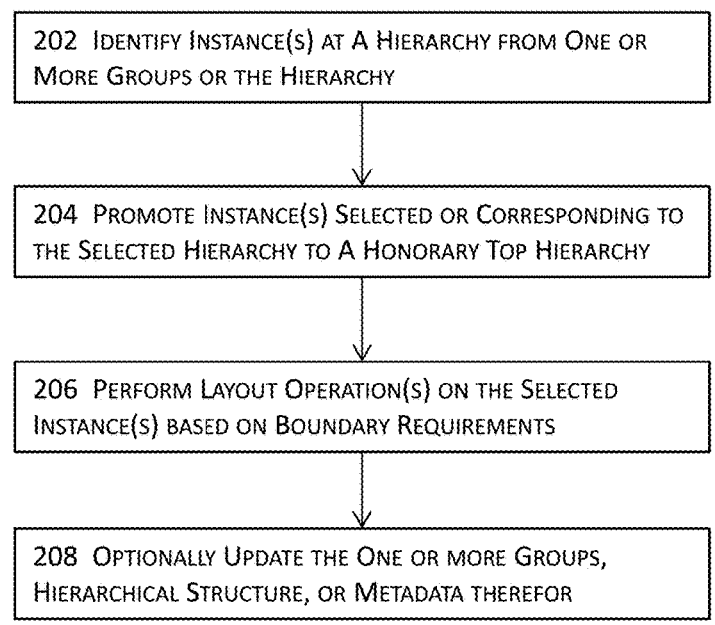
FIG. 2 illustrates a high level flow diagram for implementing legal placement with contextual awareness for an electronic design in one or more embodiments.

FIG. 2 illustrates a high level flow diagram for implementing legal placement with contextual awareness for an electronic design in one or more embodiments. In these embodiments, one or more instances or circuit component designs (collectively instances for plural or instance for singular) located at one or more hierarchies in a group within a hierarchical placement layout or floorplan may be identified at 202. These one or more instances are identified as the subject of one or more subsequent operations in these embodiments. In some other embodiments, one or more hierarchies, instead of specific instances located at these hierarchies, may be identified at 202. A group may include a physical group such as an IP (intellectual property) block, a cell, etc. in some embodiments and may include a logical group such as a collection of instances selected from a layout or floorplan by a designer.

For example, a designer may intend to modify or optimize the placement of some instances that are located at one or more hierarchies in a group that is placed in a row region of a hierarchical layout. The designer may identify these instances of interest at 202 in some embodiments. Alternatively, the designer may identify these one or more hierarchies at which these one or more instances are located at 202. In some embodiments, instances may be identified at 202 in other manners. For example, all instances within a group of interest or the group itself may be identified in some embodiments.

The one or more identified instances may be promoted to an honorary top hierarchy at 204. In various embodiments, these techniques selectively promote instances to the honorary top hierarchy while suppressing or hiding the design details of other instances to provide proper context information for performing operations on these one or more identified instances and to conserve computational resources. For example, all the instances in the same group at or above the one or more identified hierarchies will also be promoted to the honorary top hierarchy while instances situated at lower hierarchies will be represented as black boxes or placeholders having reduced or minimal information (e.g., having only size, location, and interface information) in some embodiments. In addition or in the alternative, one or more instances outside the group of interest may also be optionally promoted to the honorary top hierarchy. For example, one or more other instances that are outside of the group and are connected to the one or more identified instances in the group or are located at the same hierarchies may be optionally promoted to the honorary top hierarchy in some embodiments.

An honorary top hierarchy may or may not necessarily be the highest hierarchy in the placement layout or a portion thereof (e.g., a cell view, a row region, etc.) In some embodiments, an honorary top hierarchy represents the highest hierarchy in the entire placement layout or floorplan. In some other embodiments, an honorary top hierarchy may be a relative top hierarchy in the current view of a portion of the placement layout or floorplan. For example, an honorary top level may be the relatively highest hierarchy in a cell view, although the cell view may be situated at the fifth hierarchy in the placement layout or floorplan. As a result of an honorary top hierarchy not necessarily being the absolute highest hierarchy in the placement layout or floorplan, it shall be noted that legal placement in the present disclosure refers to the legality of the placement with respect to the honorary top hierarchy. That is, a legal placement referred to herein complies with the design rules, requirements, constraints, etc. in the honorary top hierarchy but may or may not necessarily comply with design rules, requirements, constraints, etc. beyond or outside the honorary top hierarchy when the honorary top hierarchy is not the true, highest hierarchy.

Promoting an instance at a lower hierarchy to the honorary top hierarchy effectively flattens the hierarchical structure that the instance belongs to and places the instance and any other instances now exposed from the effective flattening, at the honorary top hierarchy. Promoting an instance may be performed logically (virtually) or actually. When an instance is actually promoted from a lower hierarchy to the honorary top hierarchy, the physical hierarchical structure of the placement layout or the portion of interest thereof is altered so that the instance now reports to the honorary top hierarchy, instead of the original lower hierarchy, in the physical hierarchical structure. When an instance is logically or virtually promoted from a lower hierarchy to the honorary top hierarchy, the physical hierarchical structure of the placement layout or the portion of interest thereof remains unchanged. Rather, a model with a logical hierarchical structure is created, and a copy of the promoted instance or a lightweight representation thereof is created at the honorary top hierarchy in the model.

One or more layout operations may be performed on the one or more identified instances based in part or in whole upon one or more boundary requirements at 206. With the honorary top hierarchy properly populated with pertinent instances, these one or more layout operations may be performed on the one or more identified instances with appropriate contextual awareness. For example, a placer or a floorplanner may perform placement or floorplanning optimization on these one or more instances identified within the group at 202 with cross-boundary awareness of surrounding circuit component designs both within and outside of the group of interest. A boundary requirement includes the confine imposed on a placement module so that the placement module may rearrange instances within such a confine. More details about boundary requirements are described below with reference to FIG. 5B.

The one or more groups of interest, the hierarchical structure of the placement layout, floorplan, or a portion of interest thereof, and/or metadata therefor may be optionally updated at 208. More details about boundary requirements are described below with reference to FIG. 5C.

Figure 3:
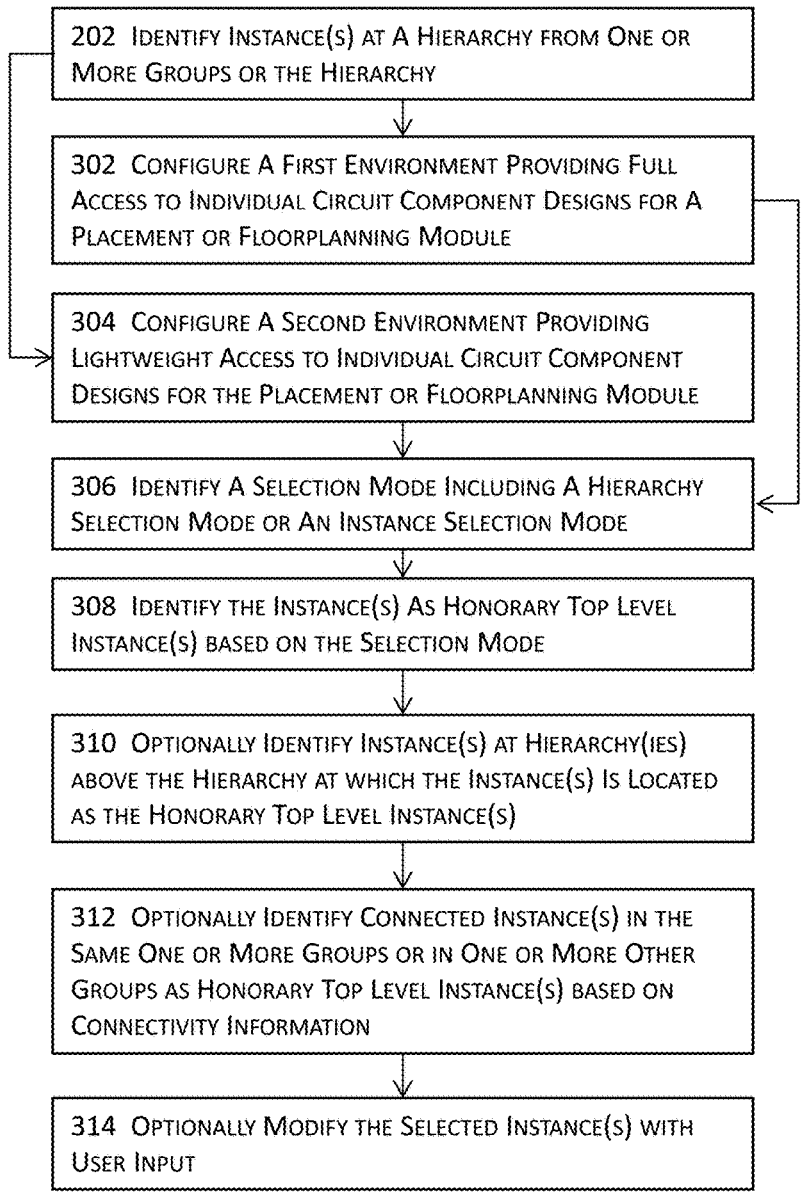
FIG. 3 illustrates a more detailed block diagram for a block illustrated in FIG. 2 in some embodiments.

FIG. 3 illustrates a more detailed block diagram for a block illustrated in FIG. 2 in some embodiments. More specifically, FIG. 3C illustrates more details about identifying one or more instances or one or more hierarchies in one or more groups at 202 of FIG. 2. In these embodiments, a first environment may be configured at 302 to provide full access to individual circuit component designs for one or more EDA tools (e.g., a placement or floorplanning module). In these embodiments, the first environment is configured to enable full, native access to individual circuit component designs in a hierarchical layout or floorplan as if the hierarchical structure is completely flattened.

In the alternative, a second environment may be configured at 302 to provide reduced or lightweight access to individual circuit component designs for an EDA tool. In these embodiments, instances may be represented as black boxes or placeholders with reduced design information that references the actual respective design data of the instances and enables the identification or selection of individual instances or individual hierarchies for further processing. Nonetheless, such reduced design information may not contain sufficient details to enable an EDA tool to perform all pertinent electronic design automation tasks.

For example, an instance may be represented in some embodiments as a placeholder having only correct geometric information and optionally some connectivity information along its boundaries but does not contain other design details to enable editing of the instance. As another example, an instance may be represented as an object with only a reference to the actual design of the instance, and the reference is configured to serve the purpose of enabling the selection or identification of the instance for further processing.

With the environment configured at 302 or 304 for these one or more EDA modules, a selection mode may be identified at 306. The selection mode may include, for example a hierarchy selection mode in which a designer or an EDA tool may select one or more hierarchies of the placement layout or floorplan, an instance selection mode in which a designer or an EDA tool may select one or more individual instances at one or more hierarchies, a default mode in which an EDA tool automatically selects one or more instances or one or more hierarchies (e.g., selecting all instances in the current group or current cell view), one or more combinations thereof, etc.

For the ease of illustration and description, the following description is based on the identification of an instance selection mode although it shall be noted that these techniques described herein apply with full and equal effects to other selection modes. One or more instances may be selected at 308 at a hierarchy as respective one or more honorary top hierarchy instances based on the selection mode. In some embodiments where a hierarchy selection mode is identified at 306, these one or more instances may be identified by selecting these one or more instances respectively located at one or more selected hierarchies. It shall be noted that these one or more instances identified at 308 may be located at more than one hierarchy in some embodiments One or more other instances in the same group located at one or more hierarchies above the hierarchy at which the one or more identified instances are located may also be optionally identified as the honorary top hierarchy instances at 310. For example, a designer may select a first instance located at the third hierarchy in a group as the instance of interest at 308 for further operations. In this example, the EDA tool may configurably select the parent instance (and optionally one or more other instance at the third hierarchy) at the second hierarchy for the selected first instance and identify the parent instance as another honorary top hierarchy instance that geometrically contains the first instance.

In some embodiments, a connected instance that is connected to at least one of the one or more instances identified at 308 may also be optionally identified at 312 as an additional honorary top hierarchy instance. This connected instance may be identified based in part or in whole upon the connectivity information. For example, an EDA tool may identify an instance that is connected to the selected instance by referencing the schematic connectivity (or physical connectivity, if available) with the mapping between the layout (or the floorplan) and the corresponding schematic design. The connected instance identified at 312 may be located in the same group or in a different group to provide appropriate context information. At 314, the instances selected or identified at 308 or optionally selected or identified at 310 and 312 may be further optionally modified by a designer. For example, a designer may add to or remove from the selected or identified instances.

Figure 4A:
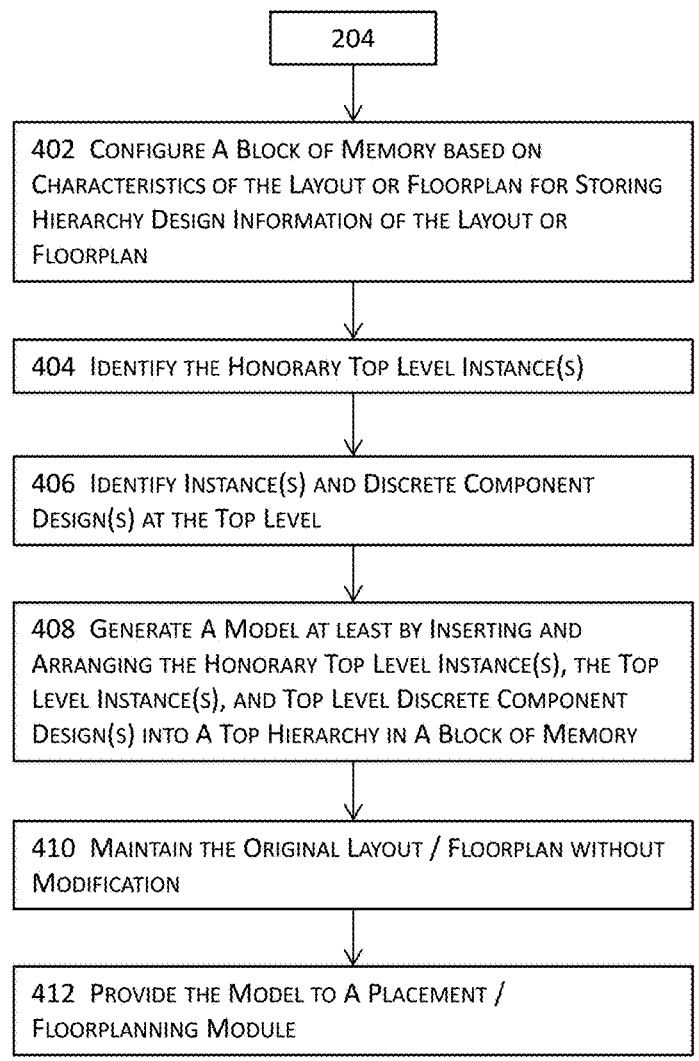
FIG. 4A illustrates a more detailed block diagram for a block illustrated in FIG. 2 in some embodiments.

FIG. 4A illustrates a more detailed block diagram for a block illustrated in FIG. 2 in some embodiments. More specifically, FIG. 4A illustrates more details about promoting an instance to an honorary top hierarchy instance at 202 of FIG. 2. In these embodiments, the original hierarchy of the layout or the floorplan is maintained while instances are promoted, and a model is created for the hierarchy manipulation from promoting instances to the honorary top hierarchy. In these embodiments, a block of memory may be configured at 402 based in part or in whole upon characteristics of the layout or floorplan for storing hierarchy design information of the layout or the floorplan. One or more honorary top hierarchy instances may be identified at 404. More details about an honorary top hierarchy instance or promoting an instance into an honorary top hierarchy instance are described above with reference to FIG. 2.

One or more additional instances at the physical top hierarchy in the layout or floorplan or at the relative top hierarchy in the current portion or view of the layout may be optionally identified at 406. These one or more additional instances may also be identified into one or more corresponding honorary top hierarchy instances together with the one or more instances identified at 308 or 202. A relative top hierarchy includes the highest physical hierarchy in the current view or portion of the placement layout or floorplan although the relative top hierarchy may or may not necessarily be the highest physical hierarchy in the entire layout or floorplan.

With the instances that are identified into the corresponding honorary top hierarchy instances and the optional additional instances identified at 406, a model may be generated at 408 by inserting and arranging the honorary top hierarchy instances into their respective locations in a flat, non-hierarchical manner in the model based on the relative positioning of these instances in the original placement layout or floorplan. In these embodiments, promoting an instance at a lower hierarchy into an honorary top hierarchy instance effectively flattens the portion of the layout or floorplan containing at least the instance. The original hierarchical structure of the layout or the floorplan is nevertheless maintained at 410 without modification. The populated model may then be provided to an EDA tool (e.g., a placer or a floorplanner) at 412.

Figure 4B:
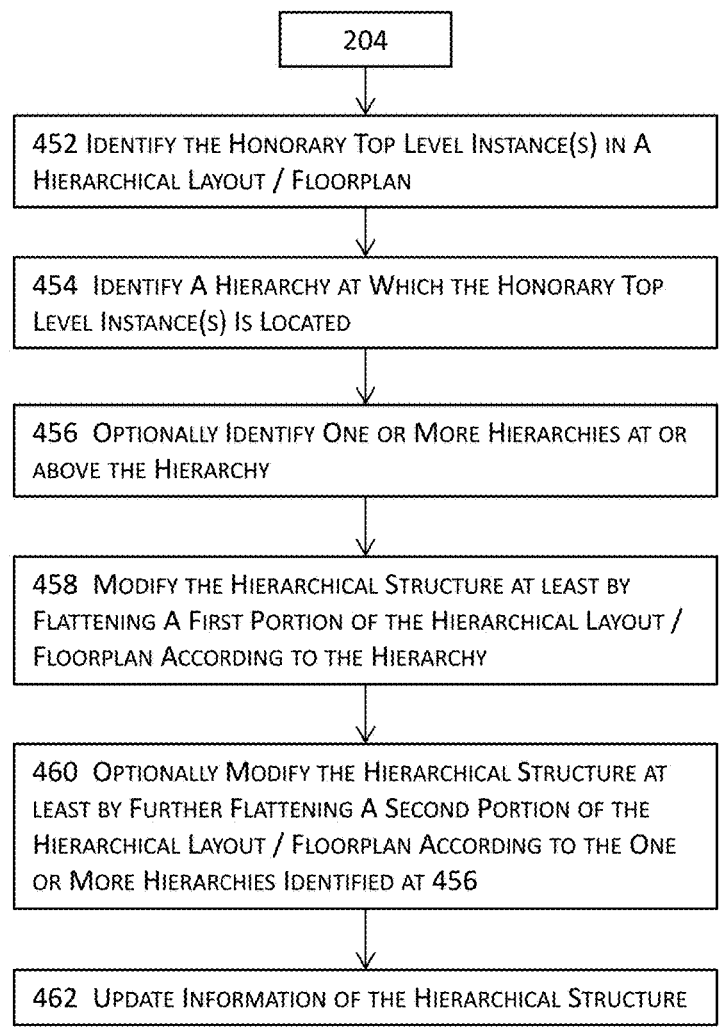
FIG. 4B illustrates another more detailed block diagram for the same block illustrated in FIG. 2 in some embodiments.

FIG. 4B illustrates another more detailed block diagram for the same block illustrated in FIG. 2 in some embodiments. More specifically, FIG. 4B illustrates more details about actually promoting an instance to the honorary top hierarchy at 202 in FIG. 2. A hierarchy described in the present disclosure may include a physical or actual hierarchy in a physical hierarchical structure or a virtual or logical hierarchy that exists logically in memory. A virtual hierarchy may be created in, for example, a virtual hierarchy in memory to represent a grouping of instances. For example, a designer may temporarily cluster a set of instances into a group so that the designer may manipulate the entire set of instances together, rather than manipulating each individual instance separately. The designer may thus create a virtual hierarchy in a logical hierarchical structure in memory for the temporary grouping of instances.

Actually promoting an instance effectively modifies the physical hierarchical structure (or virtual hierarchical structure in memory) of the hierarchical layout or floorplan by flattening the portion that comprises at least the instance to be promoted. In these embodiments, the instances to be promoted to the honorary top hierarchy are identified at 452. These instances may include the instances identified at 202 or 308 or optionally identified at 310 and/or 312.

A hierarchy at which these instances are located may be identified at 454. In some embodiments where these instances identified at 452 belong to multiple hierarchies, the lowest hierarchy among these multiple hierarchies may be identified at 454 because the process illustrated in FIG. 4B is to bring these identified instances to the honorary top hierarchy regardless of the hierarchies at which these identified instances are located.

One or more hierarchies at or above the hierarchy identified at 454 may be optionally identified at 456. One or more different instances at these one or more hierarchies other than those instances to be promoted to the honorary top hierarchy may also be optionally identified at 456. These one or more different instances in the same group(s) or in different group(s) as the instances to be promoted may be optionally identified at 456 to provide context information. For example, a different instance, although not identified to be promoted to the honorary top hierarchy, may nevertheless define the spacing requirement constraining an instance to be promoted. In this example, this different instance may be optionally identified at 456 to provide such context information for the instance to be promoted.

The physical or virtual hierarchical structure of the hierarchical layout or floorplan may then be modified at 458 at least by flattening a first portion of the hierarchical layout or floorplan according to the hierarchy identified at 454. For example, if it is determined that the instances to be promoted belong to the third and the fourth hierarchies, the fourth hierarchy may be identified at 454. In addition, one or more different instances at or above the fourth hierarchy may be optionally identified at 456 although these one or more different instances were not initially identified for promotion to the honorary top hierarchy. The portion of the layout including at least these instances identified to be promoted may then be flattened to bring these instances to the honorary top hierarchy, and the actual or virtual hierarchical structure of the layout or floorplan may thus be modified accordingly at 458 to reflect the promotion of these instances.

A second portion of the hierarchical layout or floorplan comprising at least the one or more hierarchies optionally identified at 456 may also be optionally flattened at 460, and the information or metadata of the actual or virtual hierarchical structure may be updated at 462 to reflect the modifications to the actual or virtual hierarchical structure. In the aforementioned example of promoting instances originally located at the third and the fourth hierarchies to the honorary top hierarchy, these instances will now report to the honorary top hierarchy (e.g., the second actual or virtual hierarchy), and the hierarchical structure will be updated accordingly at 462 to reflect the promotion. Compared with the process illustrated in FIG. 4A, the process in FIG. 4B actually changes the hierarchical structure of the hierarchical layout or floorplan. In contrast, the process in FIG. 4A operates on the model that is created in memory from the hierarchical structure of the original layout or floorplan. As a result, the original hierarchical structure remains unchanged by the process illustrated in FIG. 4A.

Figure 5A:
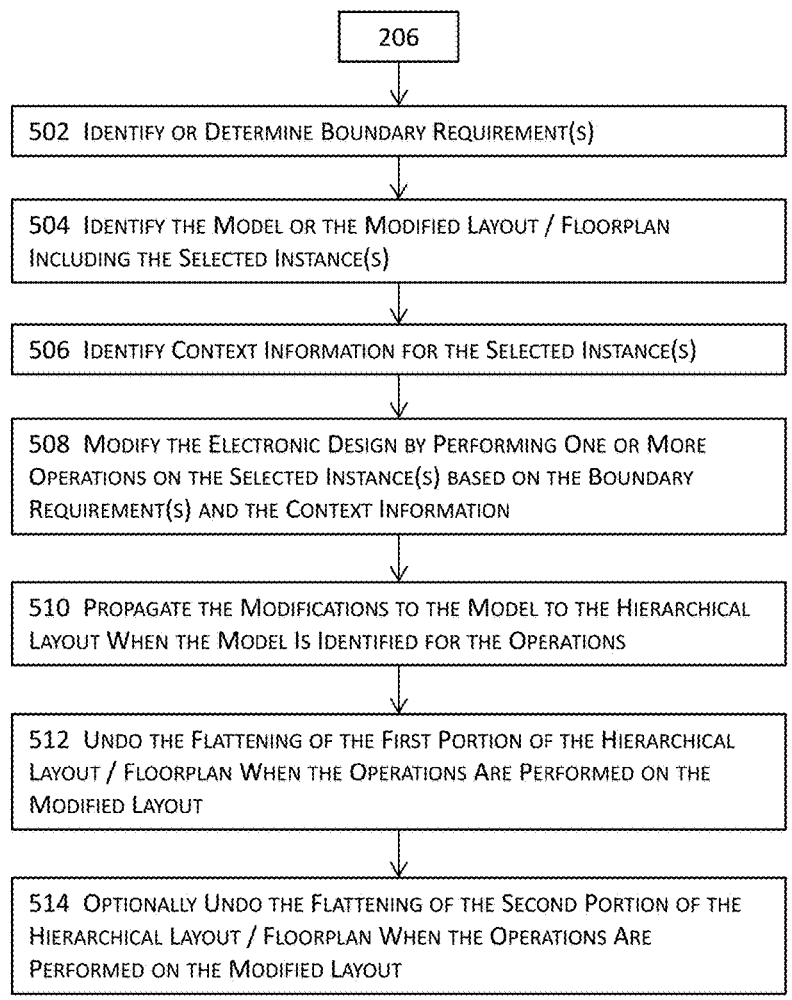
FIG. 5A illustrates a more detailed block diagram for a block illustrated in FIG. 2 in some embodiments.

FIG. 5A illustrates a more detailed block diagram for a block illustrated in FIG. 2 in some embodiments. More specifically, FIG. 5A illustrates more details about performing layout operations at 206 of FIG. 2. In these embodiments, one or more boundary requirements may be identified at 502. As briefly described above, a boundary requirement includes the confine imposed on a placement module so that a placement or floorplanning module may rearrange instances within such a confine. More details about boundary requirements are described below with reference to FIG. 5B.

The model created by the process illustrated in FIG. 4A or the modified layout or floorplan generated by the process illustrated in FIG. 4B may be identified at 504. It shall be noted that the modified layout or floorplan contains modifications only to the hierarchical structure but not to the contents of the layout or floorplan at this stage as described above with reference to FIG. 4B. This model (or the modified layout or floorplan) includes the instances selected at 202 for the performance of layout operations. Context information for these selected instances may be identified at 506. Context information for an instance includes one or more relationships (e.g., spatial relationships, connectivity relationships, etc.) between the instance and one or more instances, one or more groups, or any combinations thereof.

The layout, the floorplan, or a portion thereof (e.g., a row region accommodating the selected instances) may be modified at 508 by performing one or more layout operations on the instances of interest identified at 202 based on the one or more boundary requirements identified or determined at 502 and the context information identified at 506. In some embodiments where the model created by the process illustrated in FIG. 4A is identified at 504, the modifications made to the model by the performance of one or more layout operations may be propagated to the layout or the floorplan at 510.

In some embodiments where the modified layout created by the process illustrated in FIG. 4B is identified at 504, the physical or virtual hierarchical structure of the layout or floorplan is modified during the flattening of the first portion and optionally the second portion of the layout or floorplan to promote instances to the honorary top hierarchy for an easier performance of the layout operations in a context aware manner while consuming less computational resources. In these embodiments, the flattening of the first portion of the layout or floorplan may be undone at 512. In some of these embodiments where the second portion is also flattened, the flattening of the second portion of the layout or floorplan may be undone at 514. Undoing the flattening or promotion of instances reverts the modified hierarchical structure (e.g., by the process illustrated in FIG. 4B) back to the original hierarchical structure.

Figure 5B:
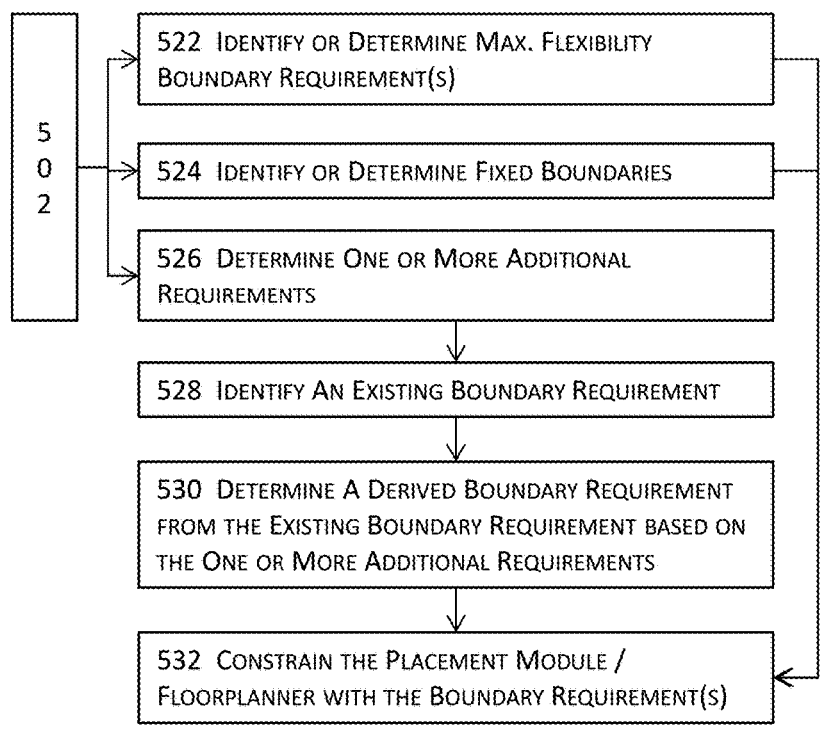
FIG. 5B illustrates a more detailed block diagram for a block illustrated in FIG. 5A in some embodiments.

FIG. 5B illustrates a more detailed block diagram for a block illustrated in FIG. 5A in some embodiments. More specifically, FIG. 5B illustrates more details about boundary requirements referenced in FIG. 5A. In these embodiments, identifying an existing boundary requirement or determining a new boundary requirement may include the identification (if existing) or determination (if non-existing) of one or more maximal flexibility boundary requirements at 522. A maximal flexibility boundary requirement imposes no bounds on the placement or floorplanning module so as to provide maximal flexibility to the placement or floorplanning module in placing instances. For example, in optimizing the placement or floorplanning of the instances in a group within the context of surrounding circuit component designs, the placement or floorplanning module may freely position or reposition these instances without being constrained by any boundary requirements. Therefore, a maximal flexibility boundary requirement provides maximal flexibility to the placement and floorplanning module and thus may achieve the most optimal legal solution, when compared to the other types of boundary requirements.

Identifying an existing boundary requirement or determining a new boundary requirement may include the identification (if existing) or determination (if non-existing) of one or more fixed boundary requirements at 524. A fixed boundary requirement imposes a fixed boundary within which the placement or floorplanning module may position or reposition instances to determine a legal solution. Fixed boundary requirements may include, for example, a boundary provided by a designer (e.g., by drawing or otherwise specifying a boundary in the layout), a boundary indicated as fixed (e.g., an IP block or cell of a third party), etc.

In addition or in the alternative, boundary requirements may include a derived boundary requirement in some embodiments. A derived boundary requirement includes a derived boundary that is derived from another boundary based on one or more addition requirements. In these embodiments, one or more additional requirements may be identified at 526. These one or more additional requirements may include, for example, an additional spacing requirement for advanced technology nodes. With these one or more additional requirements, an existing boundary requirement may be identified at 528; and a derived boundary requirement may be determined at 530 from the existing boundary requirement based in part or in whole upon the one or more additional requirements determined at 526.

For example, multi-gate devices (e.g., Fin field-effect-transistor or Fin FET) may require additional spacing, different alignment, and/or a different offset value that is different from other devices to be placed in a row region. As a result, a provided boundary for a group may need to be augmented to accommodate such additional spacing, different alignment, and/or a different offset value. In this example, a derived boundary may be determined from the provided boundary based on such additional spacing, different alignment, and/or a different offset value.

As another example, multi-pattern lithography that assigns shapes to multiple photomasks for manufacturing may also change the spacing requirements between these shapes. For example, a group of instances originally having a boundary and designed for single-mask lithography may have a first set of spacing requirements between these instances. When this group of instances is incorporated into a design for multi-patterning lithography, the first set of spacing requirements may change due to distributing these shapes among multiple photomasks. As a result, a derived boundary may be determined based on the changes in the spacing requirements for the group. The identified or determined boundary requirement may be provided to the placement or floorplanning module at 532 to constrain the placement or floorplanning module in placing various instances in a placement layout or floorplan. It shall be noted that the placement module or floorplanner described herein may be color-aware. That is, the placement module or floorplanner is aware of the design rules for photomask assignment during placement or floorplanning and may thus adjust the spacing between shapes or instances according to the mask assignments of various shapes or instances being inserted. The aforementioned example thus describes a scenario of inserting an instance or a group of instance originally designed for a single-mask photolithography into a multi-mask photolithography integrated circuit design. In some of these embodiments, the placement module or floorplanner may treat one or more boundaries as soft boundaries that may be subject to modifications (e.g., spacing adjustment due to reassignment to different mask(s)). In some other embodiments, the placement module or floorplanner may adopt conservative, hard boundaries that are constructed based on, for example, the worst case scenarios (e.g., the worst case spacing among the single-mask and multi-mask spacing requirements).

Figure 5C:
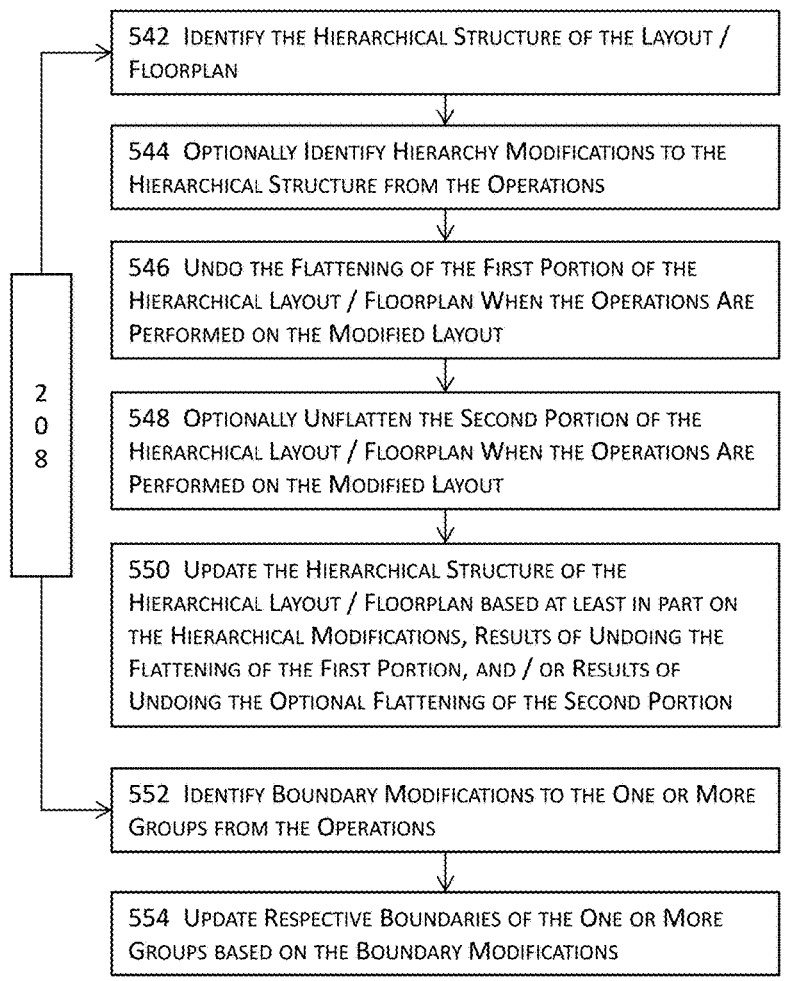
FIG. 5C illustrates a more detailed block diagram for a block illustrated in FIG. 2 in some embodiments.

FIG. 5C illustrates a more detailed block diagram for a block illustrated in FIG. 2 in some embodiments. More specifically, FIG. 5C illustrates more details about updating the hierarchical structure, one or more groups, or data therefor at 208 in FIG. 2. As described above with reference to FIGS. 4A-4B, instances of interest at lower hierarchies may be promoted to the honorary top hierarchy, and the promotion of these instances may be performed virtually or physically.

In some embodiments where promoting instances to the honorary top hierarchy operates on the model configured and stored in a block of memory as described above with reference to FIG. 4A, boundary modifications to the one or more affected groups from the performance of the layout operations (e.g., at 206 or 508) may be identified at 552; and the respective boundaries (or data or metadata thereof) of these one or more affected groups may be updated at 554 based at least in part on the boundary modifications identified at 552. The original hierarchical structure of the layout or the floorplan remains unchanged because the promotions of instances are performed on the model, rather than the original hierarchical structure.

In some other embodiments where promoting instances to the honorary top hierarchy involves modifying the actual or virtual hierarchical structure of the layout or floorplan as described with reference to FIG. 4B, the hierarchical structure of the layout or floorplan may be identified at 542. Hierarchy modifications made to the hierarchical structure by the layout operations may also be optionally identified at 544. Because promotions of instances to the honorary top hierarchy are performed on the modified layout in these embodiments, rather than on the model created from the layout or the floorplan as in FIG. 4A, the flattening of the first portion may be undone at 546; and the optional flattening of the second portion of the layout or the floorplan, if performed, may also be undone at 548 so that instances report to their respective hierarchies as intended.

In addition, any changes in the hierarchical structure from the performance of layout operations on the modified layout may also be captured. The hierarchical structure of the layout or the floorplan may then be updated at 550 based on the aforementioned modifications to the hierarchical structure of the layout or floorplan. In some embodiments, the data or metadata pertaining to the hierarchical structure may be updated at 550. Unlike those embodiments where modifications to the hierarchies are performed on the model created from the layout or the floorplan, the modifications to the hierarchies in FIG. 5C are performed on the hierarchical structure of the layout or floorplan, and the hierarchical structure thus needs to be updated accordingly. Also, the boundary modifications from the performance of layout operations, if any, are already performed on the layout or the floorplan. Therefore, the boundaries of the one or more groups affected by the layout operations are current.

Figure 6A:
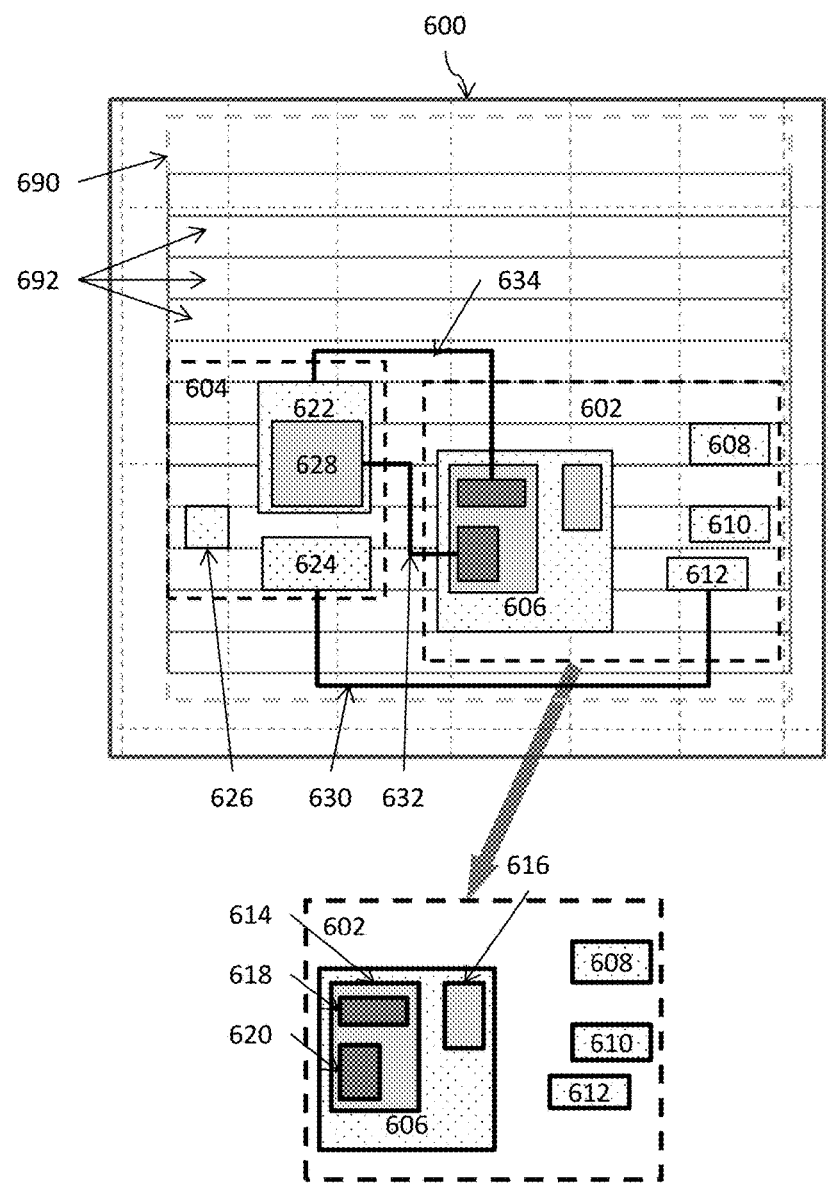
FIGS. 6A-6K illustrate some examples of the application of some techniques described herein implementing legal placement with contextual awareness for an electronic design in some embodiments.

FIGS. 6A-6K illustrate some examples of the application of some techniques described herein implementing legal placement with contextual awareness for an electronic design in some embodiments. FIG. 6A illustrates an example of a simplified layout 600 that includes a row region 690 comprising a plurality of rows 692 that are generated by, for example, the application of one or more row templates to the row region 690. Two groups, 602 and 604 with dashed boundaries, are placed in a plurality of rows 692 the row region 690 in layout 600 in a group legal manner. More details about row regions, row templates, the application of a row template to a row region, and group legal placement are described in the patent applications listed in the section entitled Cross Reference to Related Applications.

For illustration and explanation purposes, these two groups 602 and 604 are connected by topological or geometric interconnects 630, 632, and 634 although it shall be noted that such topological or geometric interconnects may not necessarily exist during the floorplanning or placement stage. Hierarchically, both group 602 and group 604 exist at the first hierarchy in the row region 690. Group 602 includes instance 606 and three discrete components or instances 608, 610, and 612, all of which are located at the second hierarchy in the row region 690. Instance 606 in the group further includes another instance 614 and a discrete component or instance 616 at the third hierarchy in the row region 690. In addition, instance 614 comprises two instances 618 and 620 located at the fourth hierarchy in the row region 690.

Group 604 includes instance 622 and two discrete components or instances 624 and 626 located at the second hierarchy in the row region 690. Instance 622 of group 604 further includes another instance 628 located at the third hierarchy in the row region 690.

Figure 6B:
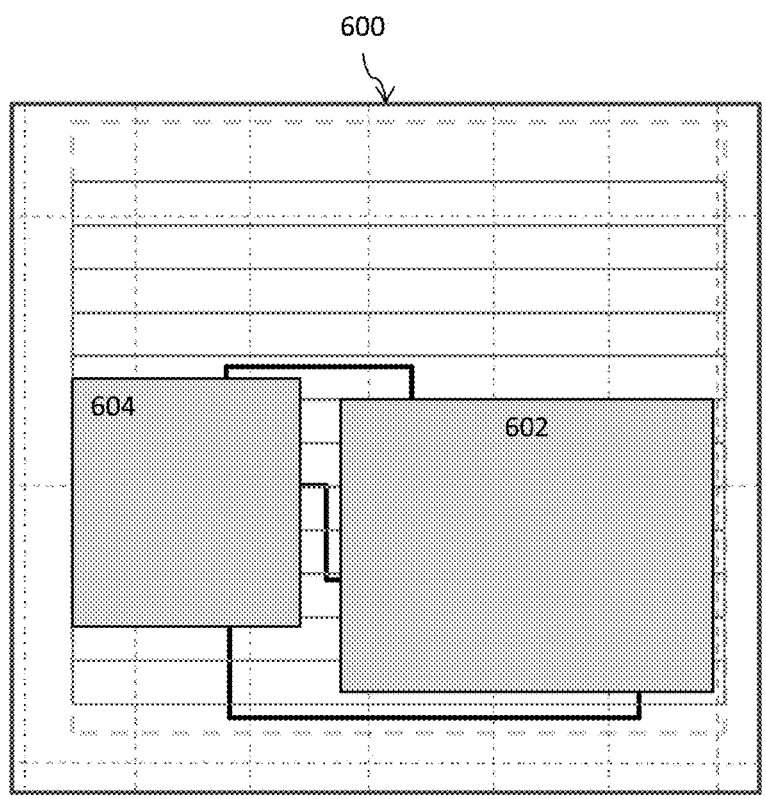

FIG. 6B illustrates an example of identifying the first hierarchy at which groups 602 and 604 are located for layout operations. In the alternative, FIG. 6B illustrates the identification of groups 602 and 604 for layout operations such as optimizing the placement of groups 602 and 604. In this example illustrated in FIG. 6B, both groups 602 and 604 are represented as placeholders or black boxes while the internal design details are suppressed or hidden. The interconnects, as shown, are connected to the respective interfaces along the boundaries of groups 602 and 604.

Figure 6C:
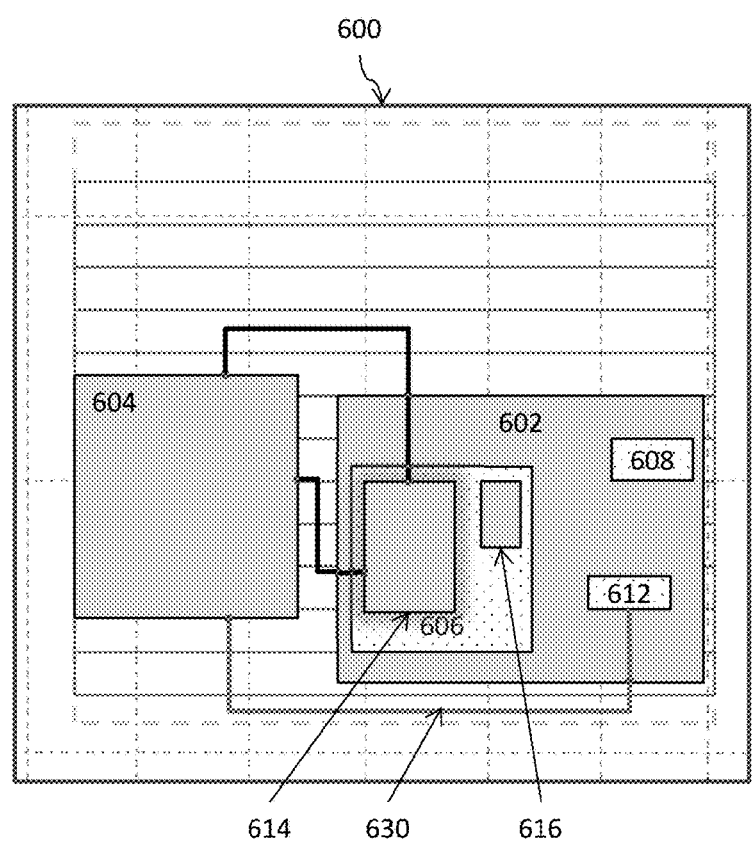

FIG. 6C illustrates the example where instance 614 is identified as an instance of interest for layout operations. For example, a designer may select instance 614 from the layout window for further layout operations. In this example, various context aware modules described herein identify instance 614 as well as its parent instance 606. These modules may further identify instance 616 although instance 616 was not originally selected. These context aware modules may identify both instance 616 and the parent instance 606 in response to the identification or selection of instance 614 because the parent instance 606 and instance 616 may both provide pertinent context information for the upcoming layout operations to be performed on instance 614.

For example, the parent instance 606 may provide the confine within which instance 614 may be repositioned; and instance 616 may also provide the spacing requirement to constrain the repositioning of the selected instance 614. Instance 608 and 612, but not necessarily instance 610, may be optionally identified by a context aware module described herein to accommodate the possibility of moving or changing the boundary of instance 606 due to the performance of layout operations on the selected instance 614. These instances may be identified or selected due to, for example, connectivity requirement (e.g., 612 being connected to 604), context information (e.g., 608 and/or 612 may provide horizontal and/or vertical spacing requirement), etc. In this example, none of the internal design details of instance 604 are identified or selected so the internal design details of instance 604 remain hidden or suppressed. The interconnects 630, 632, and 634 are also updated to reflect the identification of the selected or identified instances in instance 602. As described above, these identified or selected instances may be promoted to the honorary top hierarchy.

Figure 6D:
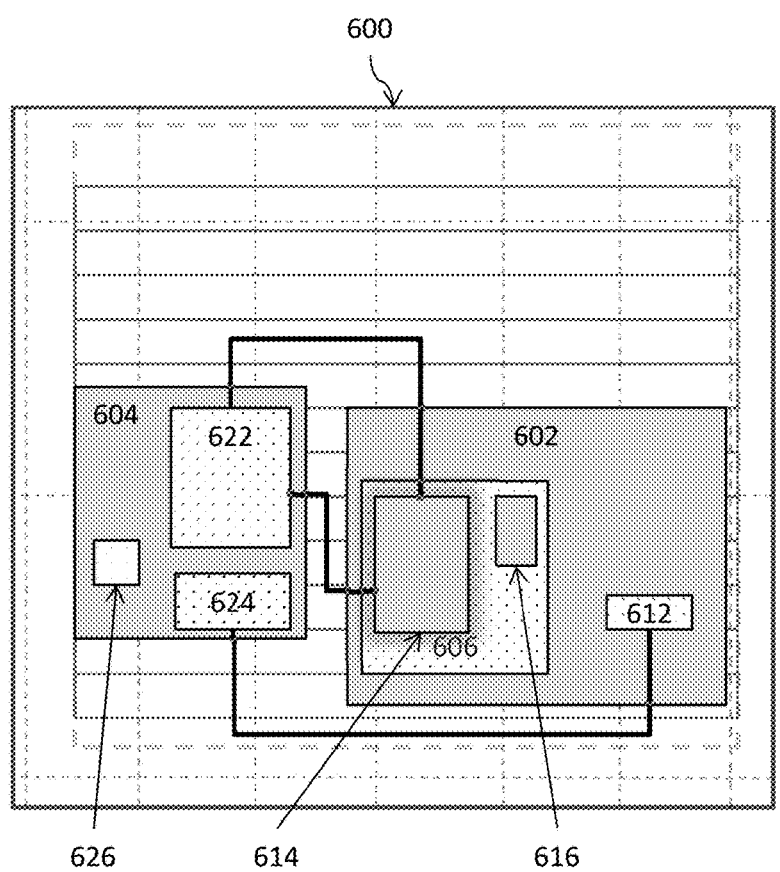

FIG. 6D illustrates another example where the parent instance 606 and instance 616 are identified by a context aware module in response to the selection or identification of instance 614. Instance 612 (but not instances 608 and 610) may also be selected for providing context information (e.g., horizontal spacing). In addition, instances 622, 624, and 626 may also be selected in this example either because of the selection of instance 606 and hence the second hierarchy at which instance 606 is located or because of their respective connections to corresponding instances in group 602. In response to the identification or selection of instances 622, 624, and optionally 626, interconnects 630, 632, and 634 are also updated to show connectivity within the group 604. As described above, these identified or selected instances may be promoted to the honorary top hierarchy.

Figure 6E:
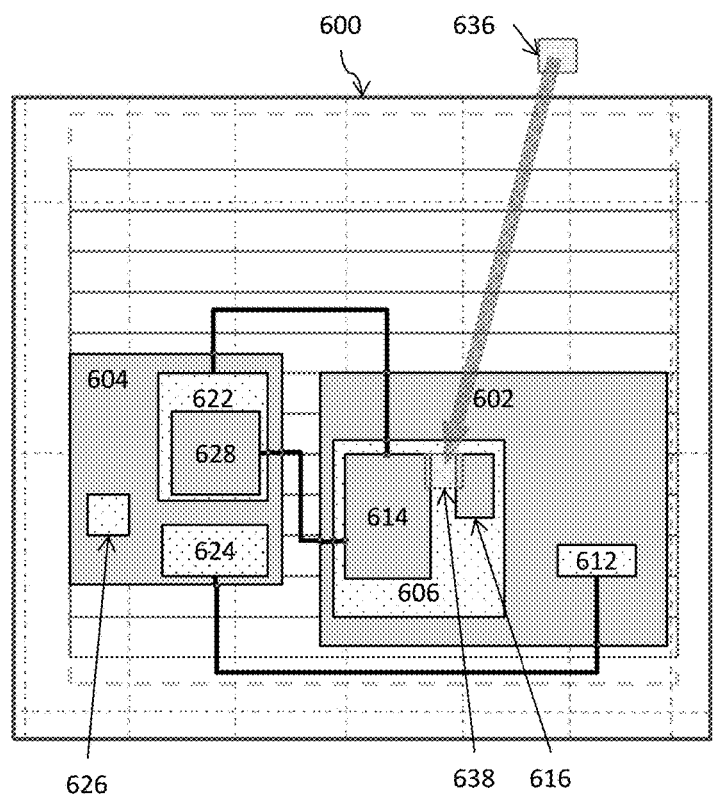

FIG. 6E illustrates an example of the performance of a layout operation—inserting an instance 636 into instance 606 in group 602 in a model or a modified layout. Unlike conventional approaches that either insert instance 636 at the highest hierarchy or flatten the entire layout or at least group 602 for the insertion, various context aware techniques described herein selectively identify or select instances and selectively promote these selected or identified instances to the honorary top hierarchy. The layout operation may include, for example, a designer dragging instance 636 with a pointing device to a location 638 displayed in the user interface. As FIG. 6E shows, inserting instance 636 at the location 638 causes interferences or overlaps with both instance 614 and instance 616.

Figure 6F:
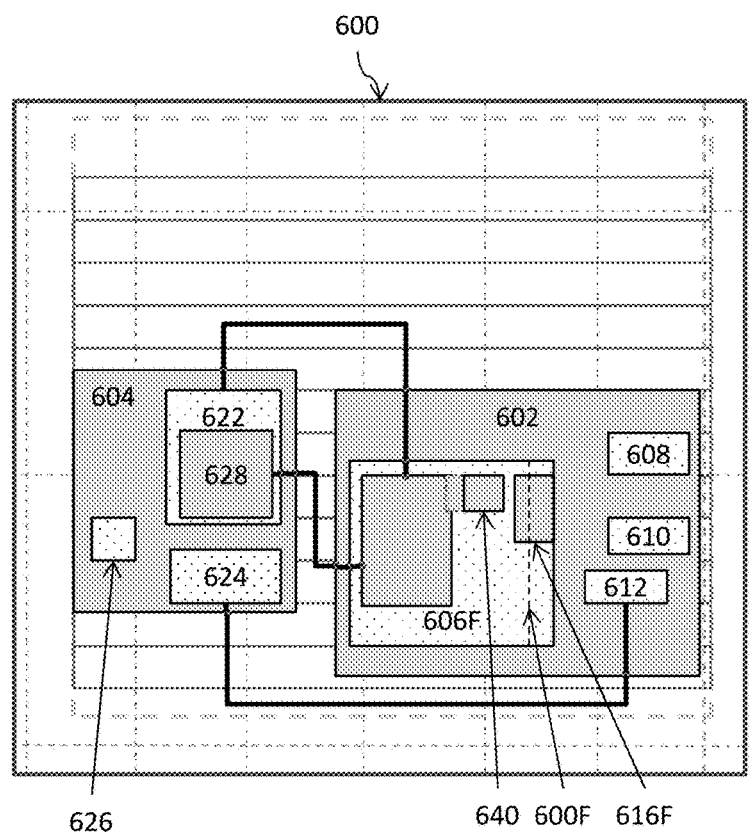

FIG. 6F illustrates the automatic overlap resolution function that is built into one or more context aware modules. As FIG. 6F shows, a context aware interactive placement module or a context aware assisted placement module may automatically identify a legal location 640 (e.g., the legal location closest to the manually designated location 638) for the insertion of instance 636 and automatically adjust the locations of instance 616 to a new, legal location 616F. As a result of pushing instance 616 to the new location 616F, the original boundary of instance as indicated by 600F no longer accommodates instance 616 at this new location 616F. In some embodiments, the boundary of instance 606 may be adjusted into the modified boundary 606F to accommodate the repositioned instance 616.

Figure 6G:
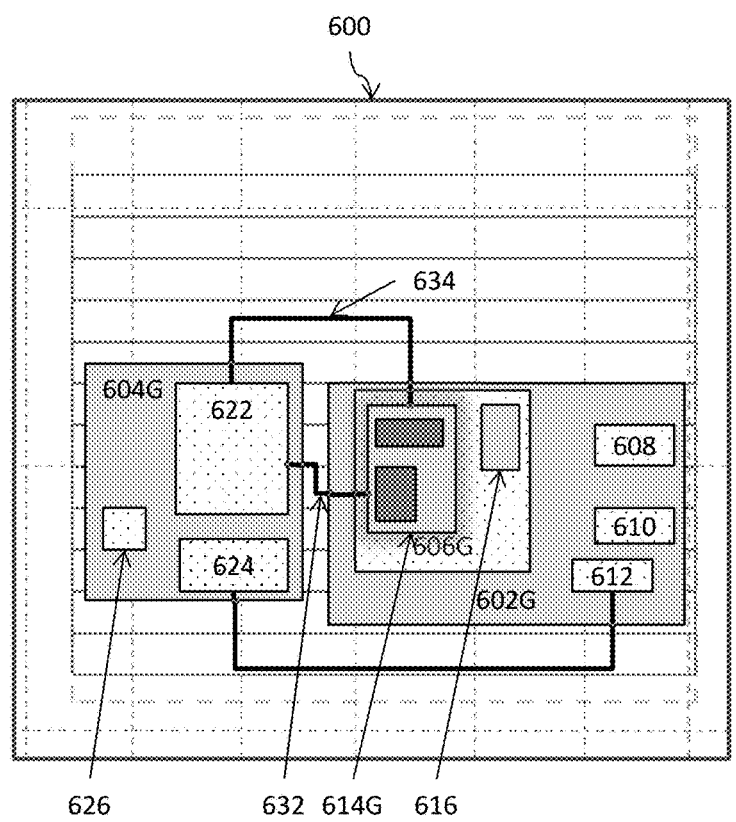

FIG. 6G illustrates an example of performance of a layout operation to the selected instance 614. More specifically, instance 614 belongs to a hard group 606 within which the relative placement of its instances remains fixed. As FIG. 6G shows, a layout operation moves the selected instance 614; and as a result, its parent instance 606 as well as the other instance 616 in the parent instance 606 are also moved to the new location 606G.

A context aware module (e.g., a context aware routing module) may further update interconnects 632 and 634 to reflect the modifications due to the performance of the layout operation to reposition instance 614 to the new legal location 614G. In addition, reposition group 602 in response to repositioning instance 614 may result in modifications to the group 602G. As FIG. 6G illustrates, the boundary or bounding box of FIG. 602G is adjusted (e.g., reduced in both the height and the width of group 602 as shown in FIG. 6G) due to the repositioning of instance 614 and hence the hard group 606. In this example, group 602 is modified both narrower and shorter due to the performance of the layout operation to reposition instance 614 (and hence the hard parent group 606).

In some embodiments where the spacing between groups 602 and 604 (or between instance 622 or 624 and instance 606 is to be maintained, group 604 may also be repositioned. For example, FIG. 6G illustrates that a context aware placement module may also reposition group 604 to the new location 604G to maintain the spacing. The determination of the new legal location 614G for instance 614 as well as the new legal location 606G may be determined in a group legal manner. More details about group legal placement of a group are described in the applications listed in the section entitled Cross Reference to Related Applications. This example illustrated in FIG. 6G shows the contextual awareness of various modules described herein and their capabilities to automatically modify the layout or a portion thereof to maintain legality and compliance with the requirements associated with the rows and grids.

Figure 6H:
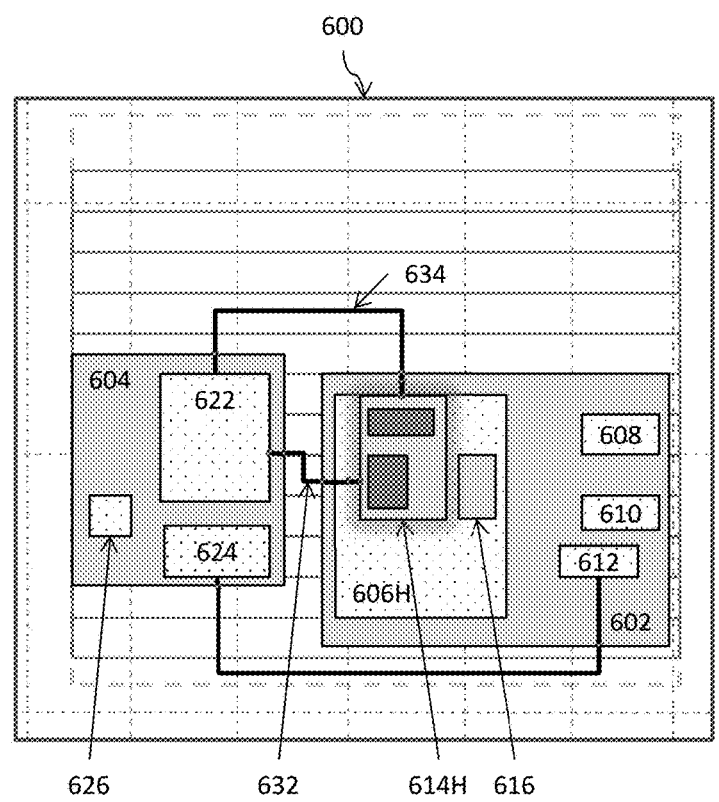

FIG. 6H illustrates an example of performance of a layout operation to the selected instance 614. More specifically, a placement module may perform the layout operation to reposition instance 614 to a new location 614H. In this example where instance 606 is considered a soft group, repositioning instance 614 to the new location 614H does not result in repositioning of its soft parent instance 606H or instance 616. Nonetheless, the boundary of instance 606 is modified accordingly to accommodate the repositioned instance 614. Similar to the example in FIG. 6G, the context aware routing module may automatically adjust interconnects 632 and 634 according to the repositioned instance 614 at the new location 614H. It shall be noted that various modules perform layout operations described throughout the entire present disclosure in a group legal manner to produce a row-compliant and grid-compliant layout or floorplan.

Figure 6I:
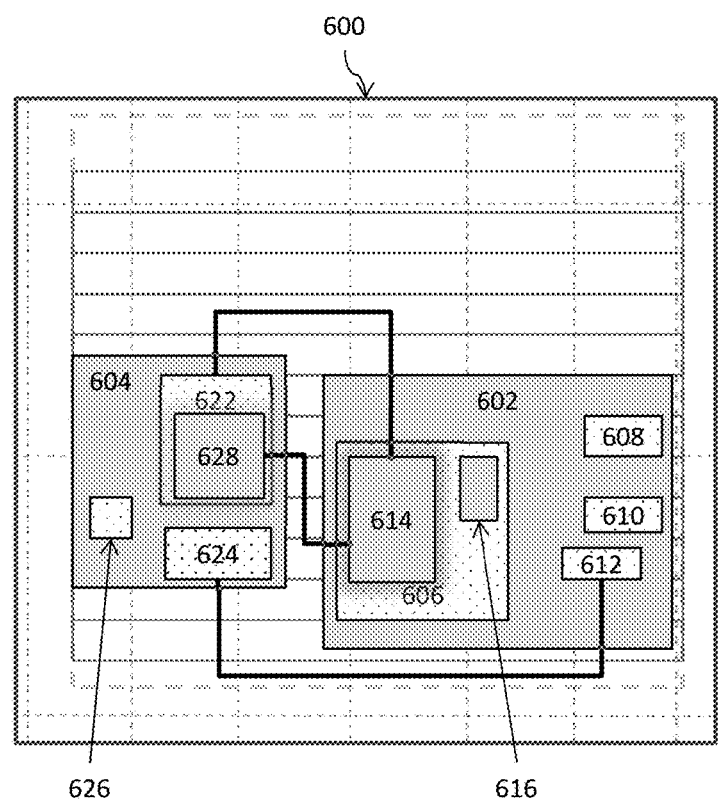

FIG. 6I illustrates another example where two instances 614 and 628 are selected (e.g., by a designer). It shall be noted that multiple instances may be selected from the same group or from different groups in a layout. These two selected instances 614 and 618 may then be promoted to the honorary top hierarchy. In some embodiments, promoting an instance at a lower hierarchy to the honorary top hierarchy automatically promotes all the instances located at the intervening hierarchy (or hierarchies if there exist multiple intervening hierarchies between the lower hierarchy and the honorary top hierarchy) to the honorary top hierarchy. In some other embodiments, promoting an instance at a lower hierarchy to a honorary top hierarchy does not promote all instances at intervening hierarchies to the honorary top hierarchy. Rather, various context aware modules determine which instances may provide context information for the selected instances and promote only these instances to the honorary top hierarchy.

In this example, selecting instance 614 may result in the identification and hence promotion of the parent instance 606 (which may provide the confine for repositioning instance 614), instance 616 (which may provide the horizontal spacing to constrain repositioning instance 614 in the horizontal direction), as well as some or all of instances 608, 610, and 612 which may provide some constraint on how far the parent instance 606 (e.g., a hard group 606) may be repositioned in response to the repositioning of instance 614. In addition, selecting instance 628 may also result in the identification and hence promotion of its parent instance 622 and optionally instances 624 and 626 located at the same, second hierarchy as the parent instance 622.

Furthermore, instance 624 may also be identified or selected by a context aware module due to its connectivity with instance 612 that is also revealed in response to the identification of instance 614. Another rule that may lead to the identification of instances 624 and 626 in response to the identification of instance 628 is that instance 624 and/or instance 626 may provide some pertinent context information (e.g., spacing requirement) for the selected instance 628 or its parent instance 622. These identified or selected instances may then be promoted to the honorary top hierarchy for this row region for the performance of layout operations to be performed on the originally selected instances 614 and 628. In some embodiments, various context aware modules may determine a region or a range of influence around a selected instance to selectively identify instances to be selected for promotion in response to the identification of the selected instance. A typical work example for selecting two instances from two separate groups is when another instance or another group is to be inserted between these two groups. This work example is illustrated in FIGS. 6J-6K and described below.

Figure 6J:
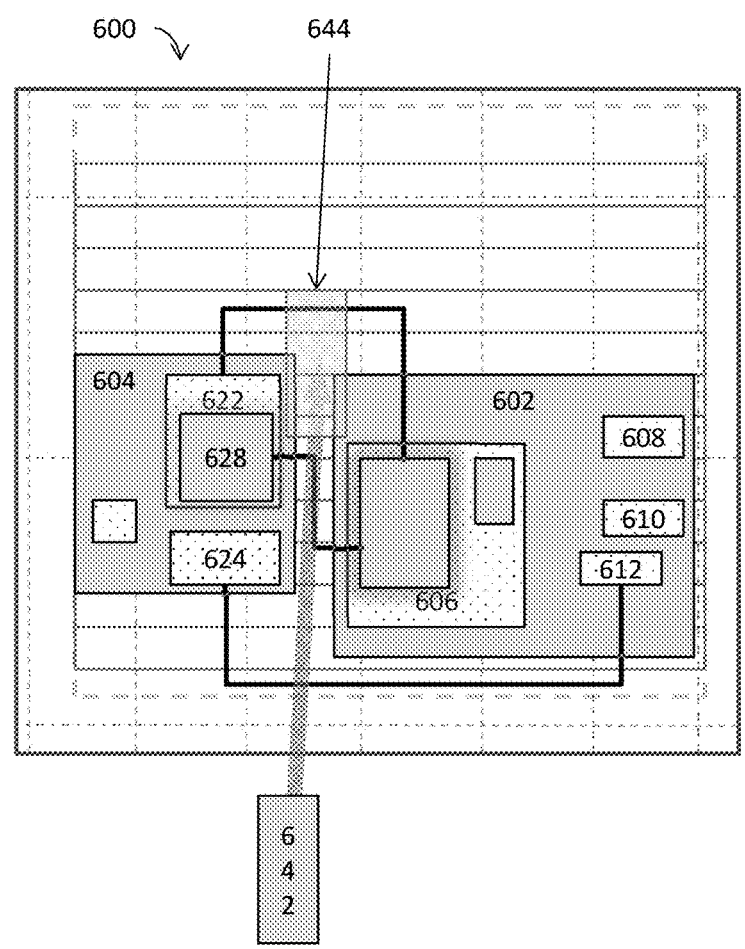

FIG. 6J illustrates a layout operation that inserts an instance 642 into the row region illustrated in FIG. 6I. For example, a designer may drag instance 642 with a pointing device to a location 644 to indicate the designer's intent to insert instance 642 at or around location 644. As it can be seen from FIG. 6J, insertion of instance 642 at location 644 may cause overlap of instance 642 with groups 602 and 604.

Figure 6K:
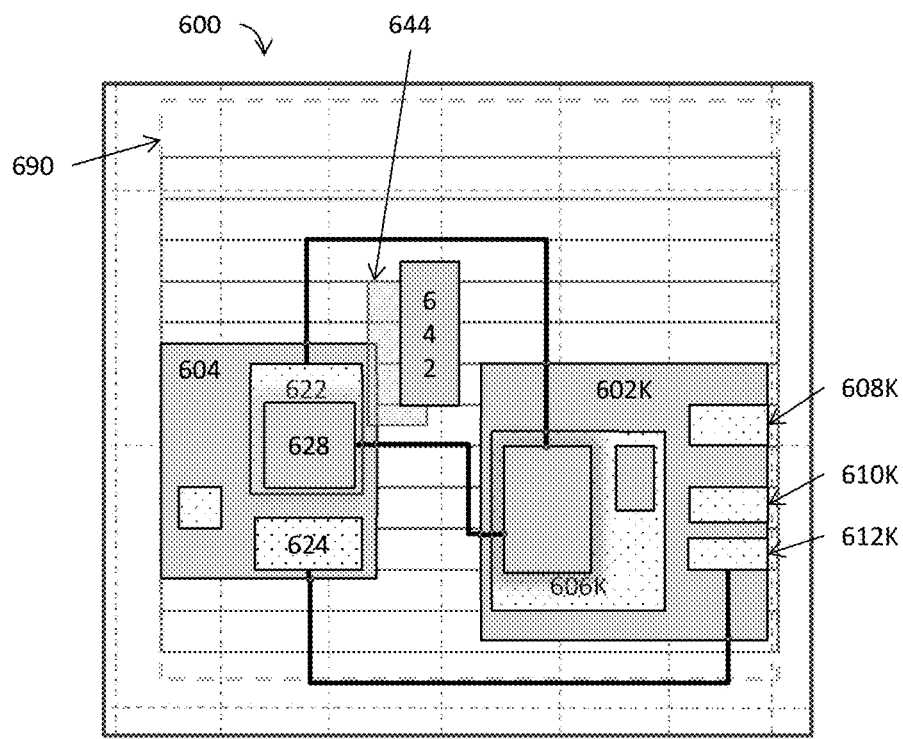

FIG. 6K illustrates the performance of the layout operation of inserting instance 642 at or about location 644. A context aware module (e.g., a context aware assisted placement module or a context aware interactive placement module) may determine that group 604 can no longer be repositioned to the left of its current location because the left boundary segment of group 604 is already aligned with the left boundary of the row region 690. The context aware module may also determine that repositioning group 604 vertically may not lead to a legal solution either because of, for example, a mismatch between certain permissible row characteristics and the corresponding characteristics of the instances in group 604 or because of non-compliance with some placement requirements (e.g., spacing requirement(s) between instance 642 and group 604 or instances therein).

The context aware module may then search the rows in the row region to the right of location 644 to find a legal location for instance 642 to place instance 642 in a row-compliant and grid-compliant manner. For example, the context aware module may place instance 642 at the minimum spacing from group 604 or instances therein. With the instance 642 placed as shown in FIG. 6K, the context aware module may determine that group 602 is no longer placed in a group legal manner because the spacing between instance 612 and group 602 (or instances therein) violates the spacing requirements.

Unless the row region may be expanded to push group 602 to the right, the context aware module may determine that group 602 may be modified to accommodate the insertion of instance 642. As a result, the context aware module repositions the locations of instance 606, 608, 610, and 612 to their respective new locations 606K, 608K, 610K, and 612K to free up some space on the left-hand side of group 602. The context aware module may then modify (e.g., shrink) the boundary of group 602 into the new boundary 602K as shown in FIG. 6K and finish the insertion of instance 642 into the row region 690.

Figure 7A:
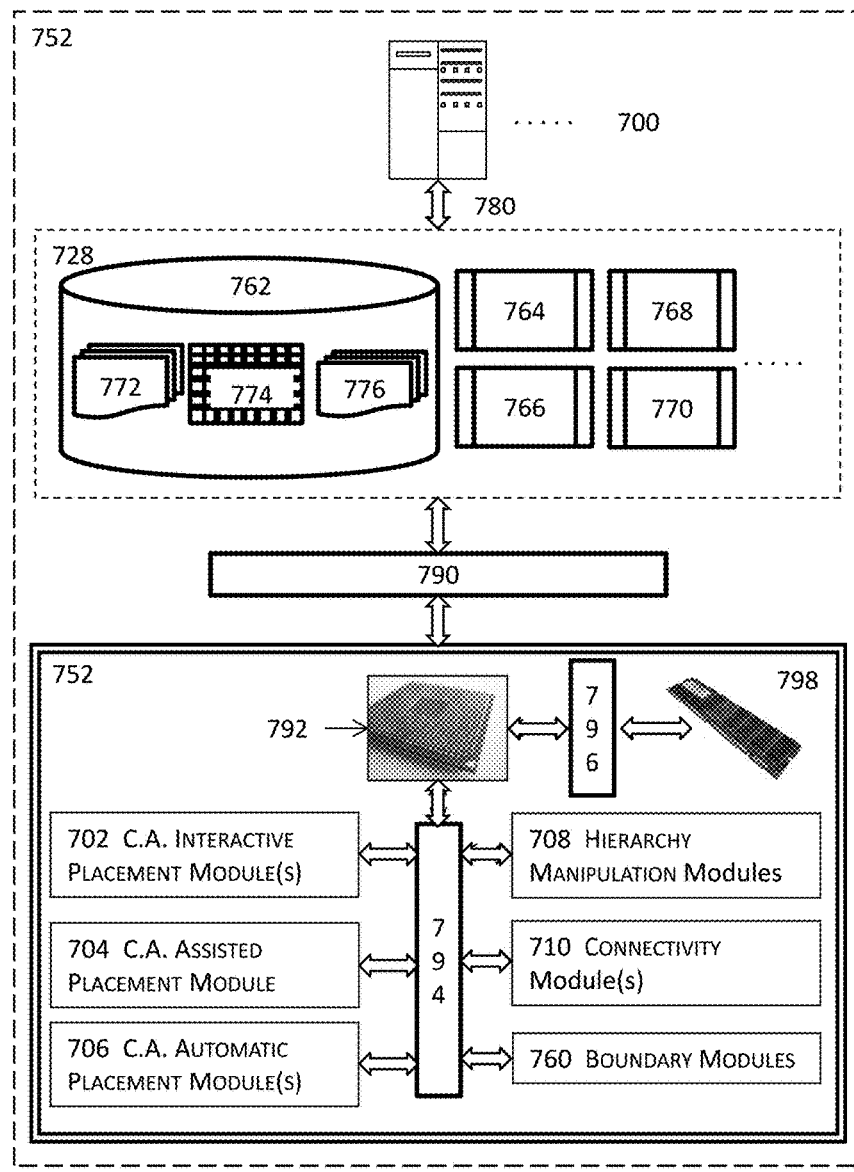
FIG. 7A illustrates a block diagram of a system for implementing legal placement with contextual awareness for an electronic design in one or more embodiments.

FIG. 7A illustrates a block diagram of a system for implementing legal placement with contextual awareness for an electronic design in one or more embodiments. More specifically, FIG. 7A illustrates an illustrative high level schematic block diagrams for a system for implementing legal placement with contextual awareness for an electronic design and may comprise one or more computing systems 700, such as a general purpose computer described in the System Architecture Overview section configured to perform unique functions described herein to achieve one or more special, intended proposes. The illustrative system in FIG. 7A may include an Internet-based computing platform providing a shared pool of configurable computer processing resources (e.g., computer networks, servers, storage, applications, services, etc.) and data to other computers and devices in an ubiquitous, on-demand basis via the Internet.

For example, one or more computing resources and/or modules illustrated in FIG. 7A may be located in a cloud computing platform in some embodiments.

In some embodiments, the one or more computing systems 700 may invoke various system resources such as the processor(s) or processor core(s), memory, disks, etc. The one or more computing systems 700 may also initiate or interact with other computing systems to access, via a computer bus architecture (e.g., a system bus, a control bus, a data bus, or any combinations thereof), various resources 728 that may comprise a floorplanner, a global routing engine, and/or a detail routing engine 764, a layout editor 766, a design rule checker 768, a verification engine 770, etc.

The one or more computing systems 700 may further write to and read from a local or remote non-transitory computer accessible storage 762 that stores thereupon data or information such as, but not limited to, one or more databases (774) such as schematic design database(s) or physical design database(s), electronic circuit design specification database(s), various statistics, various data, rule decks, various design rules, constraints, etc. (772), or other information or data (776) that may be used to facilitate the performance of various functions to achieve the intended purposes.

In some embodiments, the one or more computing systems 700 may include or, either directly or indirectly through the various resources 728, invoke a set of modules 752 including hardware modules and software modules or combinations of one or more hardware modules and one or more software modules that may comprise one or more context aware interactive placement modules 702 that interact with a designer in implementing a placement layout or floorplan. For example, a designer may manually define a region and manually drag an instance to a desired location in the manually defined region in a placement layout or floorplan, and a context aware interactive placement module 702 may determine one or more legal positions in one or more rows in a row region based on where the design drags the instance in order to insert the instance to create a legal placement layout or floorplan.

The set of modules 752 may also include one or more context aware assisted placement modules 704 that assist a designer in placing one or more instances in a placement layout or floorplan. For example, a designer may specify a set of instances to be placed in a region in a placement layout or floorplan. A context aware assisted placement module 704 may identify this set of instances and their respective characteristics, identify one or more row templates, apply the one or more row templates to the region, and determine one or more viable placement options for the set of instances. The set of modules 752 may also include a context aware automatic placement module 706 that automatically place the devices of an electronic design or a portion thereof by automatically determining one or more row regions, identifying one or more row templates, applying the one or more row templates to the one or more row regions, and placing the devices or a portion thereof into corresponding rows in the one or more row regions by using the one or more row templates, without human intervention.

The set of modules 752 may also include one or more hierarchy manipulation modules 708 that track and modify hierarchies and/or metadata thereof and alter (e.g., promoting, demoting, flattening, unflattening, etc.) hierarchies for instances and/or devices in a placement layout or floorplan. A hierarchical manipulation module 708 may also function in tandem with one or more placement modules to identify and insert honorary top level instances into models.

The set of modules 752 may also include one or more connectivity modules 710 that track, maintain, or identify physical and/or schematic connectivity information for a placement layout or floorplan. A connectivity module may also function in tandem with work with other module(s) to provide context information. For example, a connectivity module may identify connected or neighboring instances whose relationships with a selected instance may serve as the context information for the selected instance.

In addition or in the alternative, this set of modules 752 may include one or more boundary modules 760 that function in tandem with one or more other modules (e.g., a row template module, a row module, one or more placement modules, etc.) to identify, determine, set forth, and/or enforce boundary requirements and to update boundaries of various cells, blocks, and groups.

In some embodiments, the computing system 700 may include the various resources 728 such that these various resources may be invoked from within the computing system via a computer bus 780 (e.g., a data bus interfacing a microprocessor 792 and the non-transitory computer accessible storage medium 798 or a system bus 790 between a microprocessor 792 and one or more engines in the various resources 728). In some other embodiments, some or all of these various resources may be located remotely from the computing system 700 such that the computing system may access the some or all of these resources via a computer bus 780 and one or more network components.

The computing system may also include one or more modules in the set of modules 752. One or more modules in the set 752 may include or at least function in tandem with a microprocessor 792 via a computer bus 794 in some embodiments. In these embodiments, a single microprocessor 792 may be included in and thus shared among more than one module even when the computing system 700 includes only one microprocessor 792. A microprocessor 792 may further access some non-transitory memory 798 (e.g., random access memory or RAM) via a system bus 796 to read and/or write data during the microprocessor's execution of processes.

The present disclosure is directed to implement legal placement with contextual awareness for an electronic design. These techniques provide multiple levels of transparency for a physical electronic design. Each transparency level may correspond to one or more hierarchical levels (e.g., physical hierarchical levels in a layout). When a specific transparency level is selected, the details of layout design data at or above the one or more corresponding physical hierarchical levels may be presented and accessed in the design window of the user interface of the physical design tool (e.g., a placement tool), whereas the details of design data below the one or more corresponding physical hierarchical levels are abstracted in the design window.

In some embodiments, the selection of a transparency level applies to the entire layout or the portion of the entire layout presented in the design window of the user interface. In some other embodiments, the selection of a transparency level applies on an instance basis. For example, a transparency level may be set to reveal the design details at and above the third physical hierarchical level of an instance while abstracting design details below the third physical hierarchical level of one or more individual instances in the design window, without affecting the representations of the other instances in the design window.

More specifically, a placement tool may be initialized or invoked to enable selection of or access to various circuit component designs at various transparency levels or hierarchical levels. A transparency level or a hierarchical level corresponding to the transparency level may be identified from, for example, a user's selection or input. The circuit component designs including discrete circuit component designs, instances, blocks, cells, etc. that correspond to the identified transparency level or hierarchy level may be identified from, for example, the layout database.

These identified instances, blocks, cells, etc. may be temporarily dissolved or flattened to an appropriate level by creating or using a temporary data structure residing in some volatile memory without disturbing the original layout in the design window. The objects representing the circuit component designs from the dissolution of these identified instances, blocks, cells, etc. may be referenced as honorary top level objects. Other instances, blocks, cells, etc. that are not identified by the placement tool according to the transparency level or selected by the user will not be similarly processed at this stage in some embodiments.

The placement boundary requirements may then be identified for the honorary top level objects to be placed in the placement layout. Placement boundary requirements are entirely optional. That is, if the placement tool determines that placement boundary requirements are provided, the placement tool will respect the provided placement boundary requirements. Otherwise, the placement tool will follow pertinent design rules, requirements, and constraints to generate a legal placement layout for a plurality of circuit component designs with contextual awareness. The placement boundary requirements may include, for example, no bounds in order to provide more flexibility for placement in some embodiments. The placement boundary requirements may include fixed bounds in some other embodiments. For example, a user may define or alter a boundary in the layout canvas by using a point device.

Alternatively, the placement boundary requirements may include bounds derived based on the context in which the honorary top level objects are to be placed. For example, the honorary top level objects may be placed in a context that is subject to one or more rules, requirements, or constraints (e.g., a certain utilization, a certain spacing value, etc.). Another type of placement boundary requirements may include user provided bounds. For example, a user may provide or specify an additional requirement that binds on the placement tool to place the honorary top level objects with no more than a number of rows. All bounds described herein may have rectilinear shapes. With the placement boundary requirements determined, the honorary top level objects may then be placed in the placement layout within the context. Hierarchies, cells, blocks, etc. may be rebuilt, if needed.

System Architecture Overview

FIG. 7B illustrates a computerized system on which a method for implementing legal placement with contextual awareness for an electronic design may be implemented.as described in the preceding paragraphs with reference to various figures. The illustrative computing system 700B may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 700B may include or may be a part of a cloud computing platform in some embodiments.

Computer system 700B includes a bus 706B or other communication module for communicating information, which interconnects subsystems and devices, such as processor 707B, system memory 708B (e.g., RAM), static storage device 709B (e.g., ROM), disk drive 710B (e.g., magnetic or optical), communication interface 714B (e.g., modem or Ethernet card), display 711B (e.g., CRT or LCD), input device 712B (e.g., keyboard), and cursor control (not shown).

According to one embodiment, computing system 700B performs specific operations by one or more processor or processor cores 707B executing one or more sequences of one or more instructions contained in system memory 708B. Such instructions may be read into system memory 708B from another computer readable/usable storage medium, such as static storage device 709B or disk drive 710B. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 707B, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 707B for execution. Such a medium may take many forms, including but not limited to, non-volatile media and volatile media. Non-volatile media includes, for example, optical or magnetic disks, such as disk drive 710B. Volatile media includes dynamic memory, such as system memory 708B. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700B. According to other embodiments of the invention, two or more computer systems 700B coupled by communication link 715B (e.g., LAN, PTSN, or wireless network) may perform the sequence of instructions required to practice the invention in coordination with one another.

Computer system 700B may transmit and receive messages, data, and instructions, including program, i.e., application code, through communication link 715B and communication interface 714B. Received program code may be executed by processor 707B as it is received, and/or stored in disk drive 710B, or other non-volatile storage for later execution. In an embodiment, the computing system 700B operates in conjunction with a data storage system 731B, e.g., a data storage system 731B that includes a database 732B that is readily accessible by the computing system 700B. The computing system 700B communicates with the data storage system 731B through a data interface 733B. A data interface 733B, which is coupled with the bus 706B, transmits and receives electrical, electromagnetic or optical signals that include data streams representing various types of signal information, e.g., instructions, messages and data. In embodiments of the invention, the functions of the data interface 733B may be performed by the communication interface 714B.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing legal placement with contextual awareness for an electronic design, comprising:

identifying one or more hierarchies from one or more groups or one or more instances located at the one or more hierarchies in a layout or floorplan in a user interface;

flattening, at one or more context aware modules stored at least partially in memory and functioning in tandem with one or more microprocessors of at least one computing system, a portion of the layout or floorplan at least by promoting at least the one or more instances to an honorary top hierarchy;

generating a first reduced layout or floorplan at least by suppressing a plurality of circuit component designs at one or more first hierarchies that are located below the one or more hierarchies and at least by representing the plurality of circuit component designs as corresponding lightweight representations having reduced design information in a user interface;

generating a second reduced layout or floorplan at least by performing a layout operation on the corresponding lightweight representations in the first reduced layout or floorplan in the user interface based in part or in whole upon a boundary requirement of a photolithographic manufacturing process and context information generated by promoting the one or more instances to the honorary top hierarchy; and causing manufacturing of a version of the second reduced layout or floorplan with at least the photolithographic manufacturing process using one or more photomasks on lithography equipment.

2. The computer implemented method of claim 1, further comprising:

updating one or more affected groups, a hierarchical structure of the layout or floorplan.

3. The computer implemented method of claim 1, identifying the one or more hierarchies or the one or more instances comprising:

configuring an environment that provides full or lightweight access to individual circuit component designs in the layout for the one or more context aware modules;

identifying a selection mode that includes a hierarchy selection mode or an instance selection mode; and identifying the one or more hierarchies or the one or more instances based in part or in whole upon the selection mode.

4. The computer implemented method of claim 3, identifying the one or more hierarchies or the one or more instances comprising:

identifying the one or more instances into a plurality of honorary top hierarchy instances; and identifying one or more additional instances located at one or more intervening hierarchies between the honorary top hierarchy and the one or more hierarchies into the plurality of honorary top hierarchy instances.

5. The computer implemented method of claim 4, identifying the one or more hierarchies or the one or more instances comprising:

modifying the one or more instances based in part or in whole upon a user input.

6. The computer implemented method of claim 1, promoting at least the one or more instances comprising:

configuring a block of the memory based in part or in whole upon a plurality of physical characteristics of the layout or the floorplan for storing hierarchical design information of the layout or the floorplan;

identifying a plurality of honorary top hierarchy instances; and identifying circuit component designs originally located at the honorary top hierarchy into the plurality of honorary top hierarchy instances.

7. The computer implemented method of claim 6, promoting at least the one or more instances comprising:

generating a model at least by inserting and arranging the plurality of honorary top hierarchy instances;

maintaining the layout or the floorplan without modifications; and providing the model to the one or more context aware modules for performance of the layout operation.

8. The computer implemented method of claim 1, promoting at least the one or more instances comprising:

identifying a plurality of honorary top hierarchy instances;

identifying a first hierarchy at which the plurality of honorary top hierarchy instances are located;

identifying one or more higher hierarchies at or above the first hierarchy; and modifying a hierarchical structure of the layout or the floorplan at least by flattening a first portion of the layout or the floorplan according to the first hierarchy.

9. The computer implemented method of claim 1, promoting at least the one or more instances comprising:

modifying the hierarchical structure of the layout or the floorplan at least by flattening a second portion of the layout or the floorplan according to the one or more higher hierarchies; and updating information of the hierarchical structure based in part or in whole upon results of flattening the first portion or results of flattening the second portion.

10. The computer implemented method of claim 1, performing the layout operation comprising:

identifying or determining the boundary requirement, wherein the boundary requirement comprises a maximal flexibility boundary requirement, a fixed boundary requirement, or a derived boundary requirement; and identifying a modified layout created by modifying a hierarchical structure of the layout or floorplan or a model created from the layout or the floorplan and stored in a block in the memory.

11. The computer implemented method of claim 10, performing the layout operation comprising:

identifying the context information pertaining to the one or more instances; and modifying the layout or the floorplan at least by performing the layout operation on the one or more instances based in part or in whole upon the boundary requirement and the context information.

12. The computer implemented method of claim 11, performing the layout operation comprising:

propagating modifications made to the model by the layout operation to the layout or floorplan when the model is identified for the layout operation; and undo results of promoting at least the one or more instances to the honorary top hierarchy.

13. A system for implementing legal placement with contextual awareness for an electronic design, comprising:

a plurality of context aware modules, at least one of which comprises at least one microprocessor including one or more processor cores executing one or more threads in a computing system;

a non-transitory computer accessible storage medium storing thereupon program code that includes a sequence of instructions that, when executed by the at least one microprocessor or processor core of at least one computing system, causes the at least one microprocessor or processor core at least to:

identify one or more hierarchies from one or more groups or one or more instances located at the one or more hierarchies in a layout or floorplan in a user interface;

flatten, at one or more context aware modules of the plurality of context aware modules, a portion of the layout or floorplan at least by promoting at least the one or more instances to an honorary top hierarchy;

generating a first reduced layout or floorplan at least by suppressing a plurality of circuit component designs at one or more first hierarchies that are located below the one or more hierarchies at least by representing the plurality of circuit component designs as corresponding lightweight representations having reduced design information in a user interface;

generating a second reduced layout or floorplan at least by perform a layout operation on the corresponding lightweight representations in the first reduced layout or floorplan in the user interface based in part or in whole upon a boundary requirement of a photolithographic manufacturing process and context information generated by promoting the one or more instances to the honorary top hierarchy; and causing manufacturing of a version of the second reduced layout or floorplan with at least the photolithographic manufacturing process using one or more photomasks on lithography equipment.

14. The system of claim 13, wherein the program code includes further instructions that, when executed by the at least one micro-processor or processor core, cause the at least one processor or processor core to:

configure an environment that provides full or lightweight access to individual circuit component designs in the layout for the one or more context aware modules;

identify a selection mode that includes a hierarchy selection mode or an instance selection mode; and identify the one or more hierarchies or the one or more instances or the one based in part or in whole upon the selection mode.

15. The system of claim 14, wherein the program code includes further instructions that, when executed by the at least one micro-processor or processor core, cause the at least one processor or processor core to:

identify the one or more instances into a plurality of honorary top hierarchy instances;

identify one or more additional instances located at one or more intervening hierarchies between the honorary top hierarchy and the one or more hierarchies into the plurality of honorary top hierarchy instances; and modify the one or more instances based in part or in whole upon a user input.

16. The system of claim 13, wherein the program code includes further instructions that, when executed by the at least one micro-processor or processor core, cause the at least one processor or processor core to:

configure a block of the memory based in part or in whole upon a plurality of physical characteristics of the layout or the floorplan for storing hierarchical design information of the layout or the floorplan;

identify a plurality of honorary top hierarchy instances;

identify circuit component designs originally located at the honorary top hierarchy into the plurality of honorary top hierarchy instances;

generate a model at least by inserting and arranging the plurality of honorary top hierarchy instances;

maintain the layout or the floorplan without modifications; and provide the model to the one or more context aware modules for performance of the layout operation.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing legal placement with contextual awareness for an electronic design, the set of acts comprising:

identifying one or more hierarchies from one or more groups or one or more instances located at the one or more hierarchies in a layout or floorplan;

flattening, at one or more context aware modules stored at least partially in memory and functioning in tandem with one or more microprocessors of at least one computing system, a portion of the layout or floorplan at least by promoting at least the one or more instances to an honorary top hierarchy;

generating a first reduced layout or floorplan at least by suppressing a plurality of circuit component designs at one or more first hierarchies that are located below the one or more hierarchies at least by representing the plurality of circuit component designs as corresponding lightweight representations having reduced design information in a user interface;

generating a second reduced layout or floorplan at least by performing a layout operation on the corresponding lightweight representations in the first reduced layout or floorplan in the user interface based in part or in whole upon a boundary requirement of a photolithographic manufacturing process and context information generated by promoting the one or more instances to the honorary top hierarchy; and causing manufacturing of a version of the second reduced layout or floorplan with at least the photolithographic manufacturing process using one or more photomasks on lithography equipment.

18. The article of manufacture of claim 17, the set of acts further comprising:

identifying a plurality of honorary top hierarchy instances;

identifying a first hierarchy at which the plurality of honorary top hierarchy instances are located;

identifying one or more higher hierarchies at or above the first hierarchy; and modifying a hierarchical structure of the layout or the floorplan at least by flattening a first portion of the layout or the floorplan according to the first hierarchy.

19. The article of manufacture of claim 17, the set of acts further comprising:

modifying the hierarchical structure of the layout or the floorplan at least by flattening a second portion of the layout or the floorplan according to the one or more higher hierarchies; and updating information of the hierarchical structure based in part or in whole upon results of flattening the first portion or results of flattening the second portion.

20. The article of manufacture of claim 17, the set of acts further comprising:

identifying or determining the boundary requirement, wherein the boundary requirement comprises a maximal flexibility boundary requirement, a fixed boundary requirement, or a derived boundary requirement;

identifying a modified layout created by modifying a hierarchical structure of the layout or floorplan or a model created from the layout or the floorplan and stored in a block in the memory;

identifying the context information pertaining to the one or more instances;

modifying the layout or the floorplan at least by performing the layout operation on the one or more instances based in part or in whole upon the boundary requirement and the context information;

propagating modifications made to the model by the layout operation to the layout or floorplan when the model is identified for the layout operation; and undo results of promoting at least the one or more instances to the honorary top hierarchy.

* * * * *